US006927694B1

(12) United States Patent
Smith et al.

(10) Patent No.: US 6,927,694 B1
(45) Date of Patent: Aug. 9, 2005

(54) ALGORITHM FOR MONITORING HEAD/ EYE MOTION FOR DRIVER ALERTNESS WITH ONE CAMERA

(75) Inventors: Raymond Paul Smith, Titusville, FL (US); Mubarak Shah, Oviedo, FL (US); Niels da Vitoria Lobo, Orlando, FL (US)

(73) Assignee: Research Foundation of the University of Central Florida, Orlando, FL (US)

( * ) Notice: Subject to any disclaimer, the term of this patent is extended or adjusted under 35 U.S.C. 154(b) by 121 days.

(21) Appl. No.: 10/222,432

(22) Filed: Aug. 16, 2002

Related U.S. Application Data

(60) Provisional application No. 60/313,683, filed on Aug. 20, 2001.

(51) Int. Cl.[7] .............................................. G08B 23/00
(52) U.S. Cl. ..................... 340/576; 340/573.1; 340/575; 348/77
(58) Field of Search .............................. 340/576, 573.1, 340/575, 937, 439, 425.5; 180/272, 271; 382/117; 348/77, 78

(56) References Cited

U.S. PATENT DOCUMENTS

| 5,008,946 A | | 4/1991 | Ando | 382/2 |
|---|---|---|---|---|
| 5,353,013 A | * | 10/1994 | Estrada | 340/575 |

(Continued)

OTHER PUBLICATIONS

SAE Technical Paper Series, #942321, *Estimate of Driver's Alertness Level Using Fuzzy Method*, International Truck & Bus Meeting & Exposition, Yamamoto, Hirata and Higuchi, Nov. 7–9, 1994.

SAE Technical Paper Series, #942321, *Outfitting a Freightliner Tractor for Measuring Driver Fatigue and Vehicle Kinematics During Closed–Track Testing*, International Truck & Bus Meeting & Exposition, King, Siegmund and Montgomery, Nov. 7–9, 1994.

*Primary Examiner*—Phung Nguyen
(74) *Attorney, Agent, or Firm*—Brian S. Steinberger; Law Offices of Brian S. Steinberger, P.A.

(57) ABSTRACT

Visual methods and systems are described for detecting alertness and vigilance of persons under conditions of fatigue, lack of sleep, and exposure to mind altering substances such as alcohol and drugs. In particular, the intention can have particular applications for truck drivers, bus drivers, train operators, pilots and watercraft controllers and stationary heavy equipment operators, and students and employees during either daytime or nighttime conditions. The invention robustly tracks a person's head and facial features with a single on-board camera with a fully automatic system, that can initialize automatically, and can reinitialize when it need's to and provide outputs in realtime. The system can classify rotation in all viewing direction, detects' eye/mouth occlusion, detects' eye blinking, and recovers the 3D(three dimensional) gaze of the eyes. In addition, the system is able to track both through occlusion like eye blinking and also through occlusion like rotation. Outputs can be visual and sound alarms to the driver directly. Additional outputs can slow down the vehicle cause and/or cause the vehicle to come to a full stop. Further outputs can send data on driver, operator, student and employee vigilance to remote locales as needed for alarms and initiating other actions.

40 Claims, 39 Drawing Sheets

U.S. PATENT DOCUMENTS

| | | | |
|---|---|---|---|
| 5,465,079 A | * 11/1995 | Bouchard et al. | 340/576 |
| 5,595,488 A | * 1/1997 | Gozlan et al. | 434/236 |
| 5,689,241 A | 11/1997 | Clarke, Sr. et al. | 340/575 |
| 5,691,693 A | 11/1997 | Kithil | 340/439 |
| 5,765,116 A | 6/1998 | Wilson-Jones et al. | 701/41 |
| 5,786,765 A | 7/1998 | Kumakura et al. | 340/576 |
| 5,795,306 A | 8/1998 | Shimotani et al. | 600/558 |
| 5,798,695 A | 8/1998 | Metalis et al. | 340/576 |
| 5,835,616 A | 11/1998 | Lobo et al. | 382/118 |
| 5,867,587 A | * 2/1999 | Aboutalib et al. | 382/117 |
| 6,060,989 A | * 5/2000 | Gehlot | 340/576 |
| 6,070,098 A | * 5/2000 | Moore-Ede et al. | 600/544 |
| 6,091,334 A | * 7/2000 | Galiana et al. | 340/576 |
| 6,130,617 A | 10/2000 | Yeo | 340/576 |
| 6,496,117 B2 | * 12/2002 | Gutta et al. | 340/576 |
| 6,661,345 B1 | * 12/2003 | Bevan et al. | 340/575 |

* cited by examiner

Figure 3

| Initialization | 110 |

↓

| Mark lip and eye colors in image offline | 111 |

↓

| Generate RGB lip array. Find endpoints of biggest connected component. | 112 |

↓

| Generate RGB skin array. Find largest non-skin component above lips. | 113 |

↓

| Grab frame | 120 |

Daytime Initialization Output

Multi StageLip Tracker 130-133

Whole Head Tracker

Bounding Box/Rotator

Figure 13
Eye Occlusion
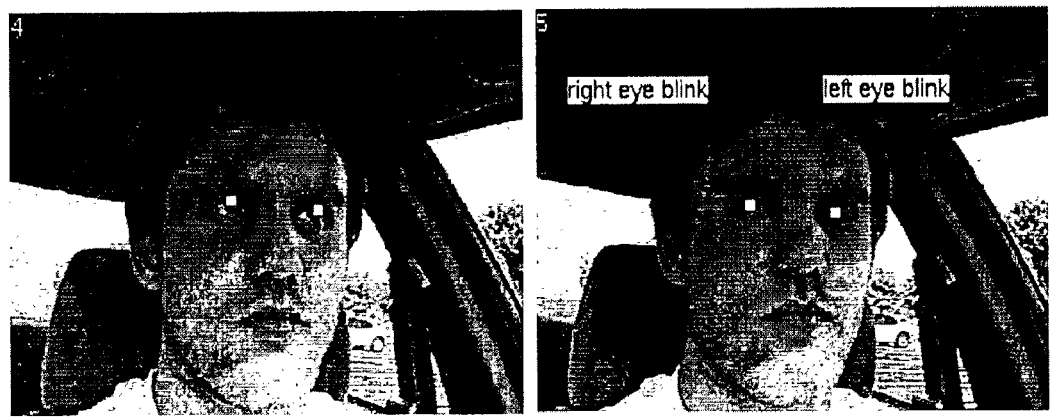
Yawning

Figure 16

```
FSM for Left/Right    330
head motion
        │
        ▼
Store rotation        331
information for the
last 20 frames as described
in steps 160/170.
        │
        ▼
If rotation in one    332
direction occurs for
more than 10 of these last
20 frames then warn driver
        │
        ▼
FSM for eye           350
occlusion
```

Figure 17
Up/Down FSM
rotating up too much
Left/Right FSM
rotating right too much Figure 19
Excessive Eye Closure
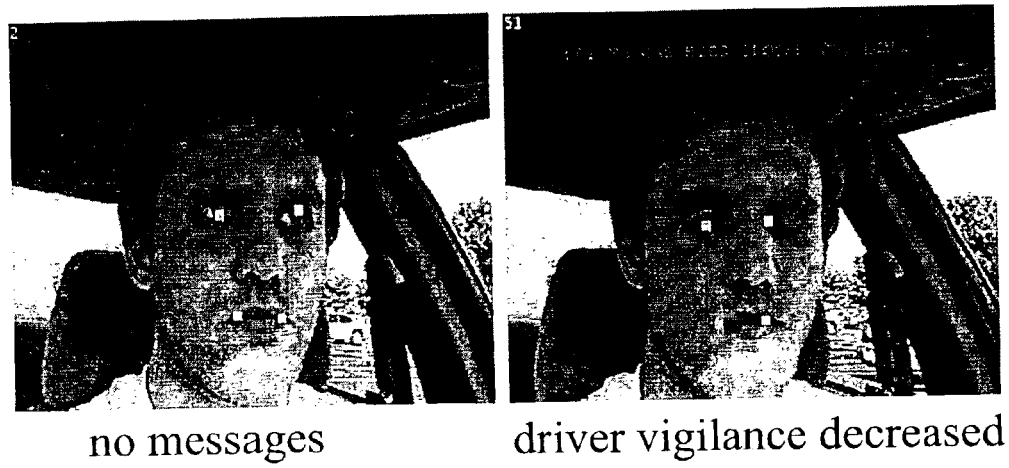
no messages		driver vigilance decreased
no messages Figure 21
Yawning Results

Eye Initialization/Bright Eye Tracker

Bright spots with dark around them

Eye/Head Tracker

Lip Tracking

Box with largest number of dark pixels, below eyes

Bounding Box/Rotation

Figure 34
Eye Occlusion
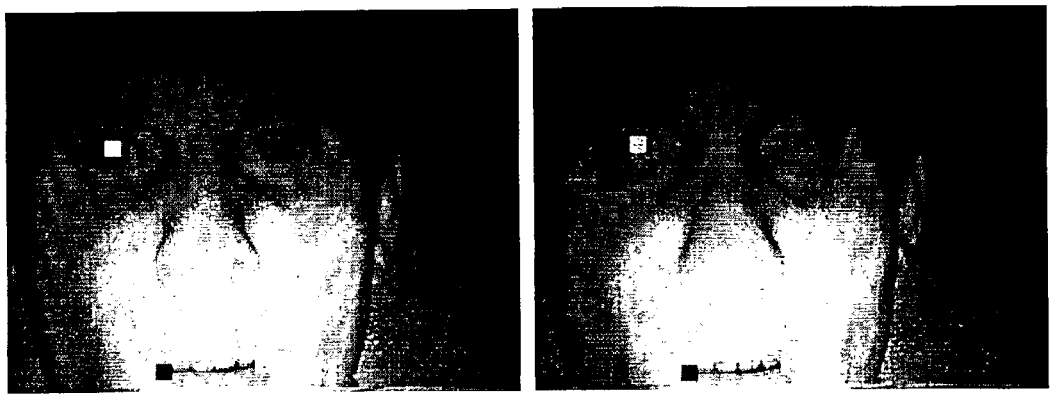
Yawning

ALGORITHM FOR MONITORING HEAD/ EYE MOTION FOR DRIVER ALERTNESS WITH ONE CAMERA

This invention relates to visual monitoring systems, and in particular to systems and methods for using digital cameras that monitor head motion and eye motion with computer vision algorithms for monitoring driver alertness and vigilance for drivers of vehicles, trucks, buses, planes, trains and boats, and operators of stationary and moveable and stationary heavy equipment, from driver fatigue and driver loss of sleep, and effects from alcohol and drugs, as well as for monitoring students and employees during educational, training and workstation activities, and this invention claims the benefit of priority of U.S. Provisional application Ser. No. 60/313,683 filed Aug. 20, 2001.

BACKGROUND AND PRIOR ART

Driver fatigue and lack of sleep of drivers especially those that drive large vehicles such as trucks, buses, etc. has been a growing problem in recent years. According to the United States National Highway Traffic Safety Administration, approximately 240,000 motor vehicle accidents occur per year in the U.S. alone due to driver fatigue, and lack of sleep. Sleep related accidents cost the American government and businesses an estimated 46 billion dollars a year. Automatically detecting alertness of drivers early enough to warn them about their lack of alertness due to fatigue can save the U.S. tax payers and businesses a significant amount of money and personal suffering.

Work on driver alertness has not yet led to a system that works in a moving vehicle. Also, none of the known attempted proposals appear to adequately deal with additional complications like mouth opening and closing, full occlusion, or blinking of a driver. For example, Yamamoto et al, Journal of SAE Japan, 46(9), 1969, did not present any methods to acquire the driver's state. Further their method relies on light emitting diodes(LEDs), and uses multiple cameras to estimate facial orientation. A moving vehicle presents new challenges like variable lighting and changing backgrounds that is not easily solvable. Most of the earlier papers on driver alertness have used intrusive techniques to acquire driver vigilance information.

In a more recent publication, Ji et al, Procs. Honda Symposium, pp. 48–55, 1999, multiple cameras are used with one viewing an entire face, and one camera with a view of the eyes only. Their idea is to move the eye camera on the fly to get the best image of the eyes, since their technique uses eye information like blink frequency. They use LEDs to minimize problems with lighting conditions. To get a more accurate estimation they propose to analytically estimate the local gaze direction based on pupil location, and mention the use of Bayesian networks to acquire information on driver vigilance.

Several techniques have been propose for improving the monitoring and vigilance of drivers and particularly to truck drivers of the large rigs to prevent their falling asleep while at the wheel which generally results in catastrophic highway wrecks. A number of these approaches will now be described.

SAE Technical Paper Series 942321 describes a known system of analyzing a "driver's facial expression, frequency of their secondary movement . . . (yawning etc . . . ) for alertness as video images alertness levels." This technique measures external factors like space in front of car, steering wheel, lateral position of car, speed of vehicle, but has no mention of detecting driver alertness with computer vision.

SAE Technical Paper Series 942326 describes closed circuit Televisions" (CCTV) and video camera to monitor driver behavior and video instrumentation to monitor a driver's face. This technique describes the use of braking and shifting information including steering patterns, brain wave, revolutions per minute(rpm). Video images are used to manually get ground truth to decide upon the driver's vigilance level. There was no use of camera data for computer vision purposes.

In addition to the publications referred above, the inventors are aware of several United States Patents that propose related techniques which will now be described.

U.S. Pat. No. 5,798,696 to Metalis describes sensors that can detect "Headrolls" to determine driver impairment. However, these "sensors" are intrusive and require the subject to wear eyeglasses. The system also uses accelerometers and measures the driver's performance by means of lateral vehicle movements.

U.S. Pat. No. 5,795,116 to Wilson-Jones et al. describes a system using video cameras on vehicles to detect lane markings and vehicle related thereto and does not use computer vision.

U.S. Pat. No. 5,691,693 to Kithil describes a system for detecting head position and head motion with sensors, abstract, for determining driver "impairment." However, this technique does not use computer vision techniques or cameras, and instead uses capacitive coupling and true sensors to locate head with no disclosure of how it compares or measures head motions to predefined head motions.

U.S. Pat. No. 5,689,241 to Clarke, Sr. et al. describes a system using a "digital "camera" to focus on eye and nose facial features and detects head and eye movement as a driver alertness system. This technique uses infrared technology to detect facial features with thermal sensors as the main criteria for determining driver alertness. These sensors measure temperature of facial regions like the nose and mouth. However, this technique does not show how to locate the face initially or mention rotation as a factor in determining driver alertness. This techniques method would not be able to deal with rotation of the head which can occur with driver fatigue and driver loss of sleep. This technique detects eye blinking by using temperature differences which is unrelated to computer vision.

With the advent of the electronic age and the increase in catastrophic wrecks of big rigs on the highway system, driver alerting systems have employed some computer vision techniques which will not be described.

U.S. Pat. No. 5,008,946 to Ando describes a system for recognizing images using a television type camera to analyze various facial features such as eyes, mouth, and facial detection to control electrical devices in a vehicle. This patent's algorithms are simple but are ineffective. This technique uses electrical devices to look for certain motions which are not able to determine driver alertness since it cannot recognize unrestricted movements; uses no kind of hierarchical tracking, does not address full facial occlusion, and, requires the use of mirrors to shine light on the driver's face.

U.S. Pat. No. 5,795,306 to Shimotani et al. describes a system using CCD cameras to detect features of a driver's face such as pupil position (blinking, etc.) to determine drowsiness levels. Since this technique performs a tilt analysis over two or more minutes, it does not perform any real time driver alertness detection. It also uses infrared technology, lights to shine on driver's face and a mirror system to shin light on driver's face.

U.S. Pat. No. 6,130,617 to Yeo describes a system of using a CCD camera to detect eyes and nostril area to determine if a driver is drowsy. This technique uses binary images for detection. However, this technique could break down with varying lighting conditions.

U.S. Pat. No. 5,786,765 to Kumakura et al. describes a driver alertness system using a camera to detect eye blinkage levels to determine driver alertness. Their system only uses eye data, does not take into account head rotation or occlusion. Furthermore, their system does not say how they compute blinks. They use eye blink frequency, but nowhere do they describe how to the detect eyes. Also, the driver vigilance system waits a whole minute before making a determination of driver alertness, which would be too long to be used as a real time warning or alarm system.

U.S. Pat. No. 5,786,765 to Galiana et al. describes an alertness monitor that checks both head motion by sensors and eyelid movement by digital type cameras, and activates alarms when threshold levels are reached and mentions several other unsubstantiated claims. This technique would not work during rotation or other prolonged occlusion of a driver's head.

U.S. Pat. No. 6,070,098 to Moore-Ede et al. describes a system of using video data to detect head movement and eye tracking data to detect eye blinking, open and closed position, to check if the data exceeds thresholds levels for a driver alertness system. It uses neural networks to compare abnormal movements like blank stares, yawning, and mentions classifying motions automatically, by a "neuro-fuzzy" system. It is said that the hybrid network generates and learns new categories of eye/head movement without any discussion of how their method works without presenting results in a convincing way.

U.S. Pat. No. 5,835,616 to Lobo et al. (one of the inventors of the subject invention) describes a digital video camera system for detecting facial features such as eyes, lips, and sides of face, and uses methods that rely on gray scale data. The system does not analyze video sequences and has a very controlled environment which would have difficulty being adapted to drivers.

In addition to the above publications and patents, the inventors are aware of recent techniques that are both complex and inadequate to adequately track facial images and features to monitor alertness of drivers suffering from fatigue and lack of sleep.

For example, it is known to use a method to detect the face and eyes of a person's head that uses multiscale filters like an elongate second derivative Gaussian filter to get the pre-attentive features of objects. These features can be supplied to different models to further analyze the image. The first is a structural model that partitions the features into facial candidates, and they incorporate an eyebrow model to avoid misclassifications. After they obtain a geometric structure that fits their constraints they can use affine transformations to fit the real world face. Next their system uses a texture model that measures color similarity of a candidate with the face model, which includes variation between facial regions, symmetry of the face, and color similarity between regions of the face. The texture comparison relies on the cheek regions. Finally they use a feature model to obtain the location of the eyes. Their method uses eigen-eyes and image feature analysis. In addition they use the fact that the directions of the pre-attentive features of the eyes must be in roughly the same direction. Then they zoom in on the eye region and perform more detailed analysis. Their analysis includes hough transforms to find circles and reciprocal operations using contour correlation.

Another approach is a system using 3D(three dimensional) vision techniques to estimate and track the 3D line of sight of a person using multiple cameras. Their approach also uses multiple point light sources to estimate the line of sight without using user-dependent parameters, thus avoiding cumbersome calibration processes. The method uses a simplified eye model, and it first uses the Purkinje images of point light sources to determine eye location. Then they use linear constraints to determine the line of sight, based on their estimation of the cornea center.

Finally, another method uses the Support Vector Machines (SVMs) to solve pattern recognition problems. SVMs are relatively old, but applications involving real pattern recognition problems is recent. First they do skin color-based segmentation based on single Gaussian chrominance models and a Gaussian mixture density model. Feature extraction is performed using Orthogonal Fourier-Mellin Moments. Then they show how, for all chrominance spaces, the SVMs applied to the Mellin Moments is better than a 3-layer perceptron Neural Network.

These other driver alertness techniques set forth above generally rely on non-camera methods which do not provide actuation of the alerting signal in sufficient time to avert an accident. These camera systems use: video sequences which are vastly different in the techniques used for single camera images; artificial or infrared lighting or using systems of mirrors to reflect light on the driver's face to determine vigilance; and also operate only under controlled situations (not in a fully unrestricted daytime environment); and, do not disclose the use of use of a single camera with neither artificial nor infrared lighting nor using systems of mirrors to reflect light on the driver's face to determine driver vigilance; and, no algorithim system which actually reconstructs the driver's gaze by focusing on the driver's face.

SUMMARY OF THE INVENTION

A primary objective of the invention is to provide a system and method for monitoring driver alertness with a single camera focused on the face of the driver to monitor for conditions of driver fatigue and lack of sleep.

A secondary objective of the invention is to provide a system and method for monitoring driver alertness which operates in real time which would be sufficient time to avert an accident.

A third objective of the invention is to provide a system and method for monitoring driver alertness that uses a computer vision to monitor both the eyes and the rotation of the driver's head through video sequences.

A fourth objective of the invention is to provide a system and method for monitoring driver alertness that recognizes unrestricted movements of the driver.

A fifth objective of the invention is to provide a system and method for monitoring driver alertness by monitoring full facial occlusion of the driver.

A sixth objective of the invention is to provide a system and method for monitoring driver alertness without shining light(either artificial or infrared or LED, etc.) on the driver's face.

A seventh objective of the invention is to provide a system and method for monitoring driver alertness which reconstructs the driver's gaze by focusing on the driver's face.

An eighth objective of the invention is to provide a system and method for monitoring operators or heavy stationary equipment to determine vigilance from effects of lack of sleep, fatigue, drugs and alcohol.

A ninth objective of the invention is to provide a system and method for monitoring students and employees at their workstation and/or during educational and training exercises to determine vigilance from effects of lack of sleep, fatigue, drugs and alcohol.

The novel invention includes a preferred embodiment that can check for several detected conditions from the visual images of the driver from a single camera. In particular the invention can check frequency values of prolonged rotations of the driver's head, eye closings of the driver, and yawning of the driver within several frames of a detected visual image. Alarm signals can be generated if the frequency values of the measured driver vigilance exceed pre-selected values. Alarm signals can be given to the driver immediately in either or both visual or sound emitting forms. Additionally, or alternatively, alarm signals can slow down the vehicle and/or stop the moving vehicle. Still furthermore, alarm signals can alternatively, or additionally be sent to remote locations.

The invention has applicability to detecting driver fatigue, lack of sleep of the driver, and/or that have become impaired by alcohol, prescription, and illegal drugs, and can be easily used during either or both daytime or nighttime conditions.

The novel invention can be mounted on board a vehicle such as a bus, a cab, and a truck by having a single camera mounted on or adjacent to the dashboard.

Another applicability of the invention is for use within train or subway car for detecting engineer fatigue, lack of sleep of the engineer, and/or engineers that have become impaired by alcohol, prescription drugs, legal and illegal drugs.

Still another applicability of the invention is for use within a watercraft such as a boat for detecting boat skipper fatigue, lack of sleep of the skipper, and/or skippers that have become impaired by alcohol, prescription drugs, legal and illegal drugs.

Still another applicability of the invention is for use within a cabin of a plane for detecting pilot fatigue, lack of sleep of the pilot, and/or pilots that have become impaired by alcohol, prescription drugs, legal and illegal drugs.

Still another applicability of the invention is for use with monitoring operators of stationary or movable heavy equipment such as cranes and tractors for detecting operator fatigue, lack of sleep of the operator, and/or operators that have become impaired by alcohol, prescription drugs, legal and illegal drugs.

Still another applicability of the invention is for monitoring students and/or employees at their workstations to detect vigilance and attention to determine if conditions such as lack of sleep, fatigue, alcohol, prescription, legal and illegal drugs exist that affect the vigilance.

The novel driver alertness methods and systems can classify head movements for warning drivers, operators, students and employees in a real time bases when they fell asleep. Also, it could be used to gather statistics about a driver's, operators, students and employees gaze.

According to the invention, there is a monitoring alertness device comprising: a single camera aimed at the facial region of the person which utilizes a system comprising the step of a means for detecting alertness facial features from a single camera wherein said alertness features include the act of nodding off, wherein said act of nodding off is recognized by detecting any change in the size of the person's face or in the facial features of the person's wherein said detecting of any change is through use of an algorithm whereby the person is alerted.

Other features, objects and advantages of the invention will become apparent from the following detailed description when read in connection with the accompanying drawings.

BRIEF DESCRIPTION OF DRAWINGS

FIG. 3 is a flow chart illustrating the initialization steps for FIGS. 1 and 2.

FIG. 13 are visual images illustrating eye occlusion detection and yawing detection of FIGS. 11–12.

FIG. 16 is a flow chart of the FSM steps for determining left/right head motion of FIG. 14.

FIG. 17 are visual images of the FSM steps for FIGS. 15 and 16.

FIG. 19 are visual images of the FSM steps for FIG. 18.

FIG. 21 are visual images of the FSM steps of FIG. 20.

FIG. 34 are visual images illustrating eye occlusion and yawning detection of the preceeding figures.

DETAILED DESCRIPTION OF PREFERRED EMBODIMENTS

Figure 1:
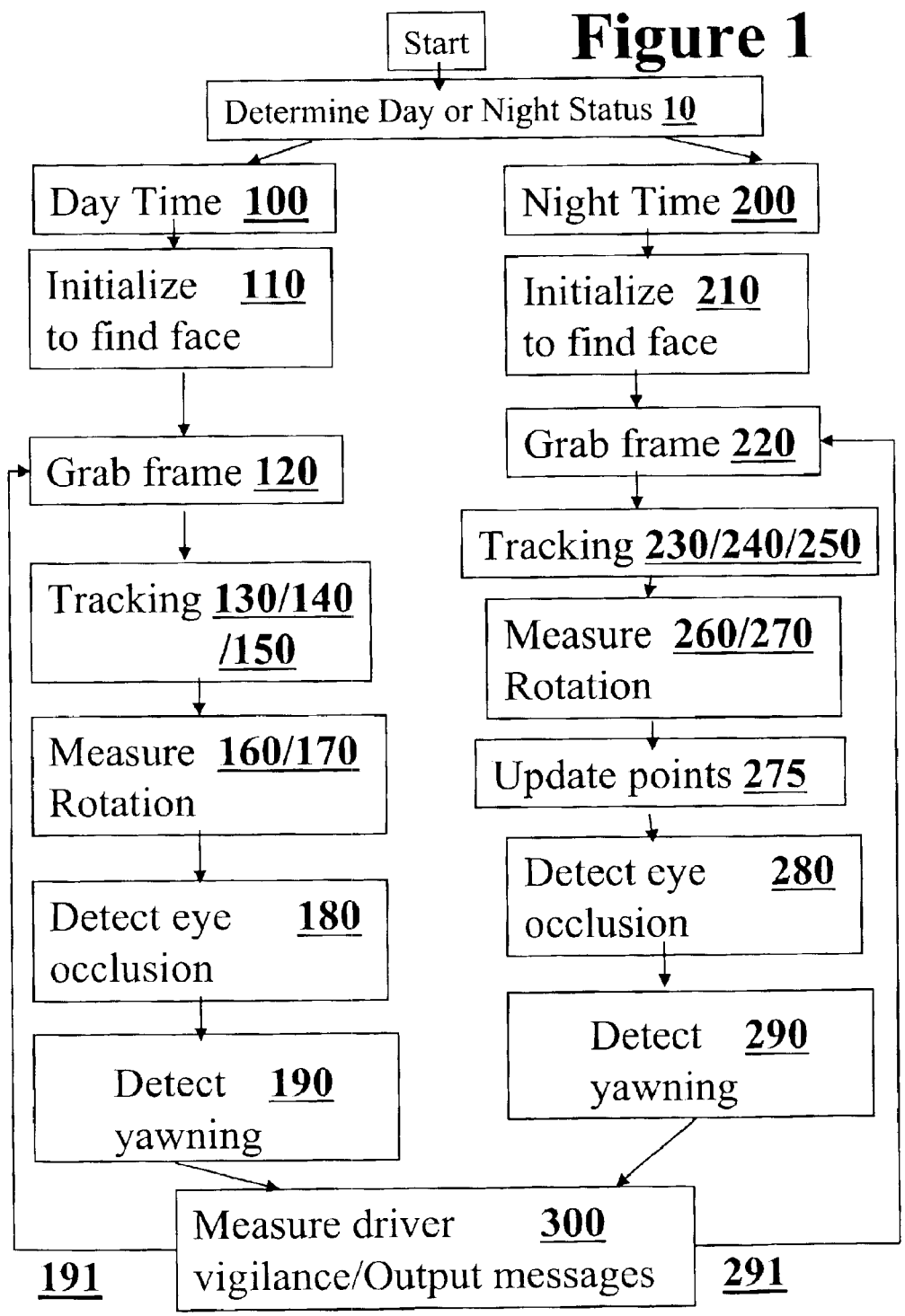
FIG. 1 is an overview flowchart of a preferred novel method and system for measuring driver vigilance and outputting alarm messages.

Before explaining the disclosed embodiment of the present in detail it is to be understood that the invention is not limited in its application to the details of the particular arrangement shown since the invention is capable of other embodiments. Also, the terminology used herein is for the purpose of description and not of limitation.

The novel invention can analyze video sequences of a driver for determining when the driver is not paying adequate attention to the road. The invention collects data with a single camera placed that can be placed on the car dashboard. The system can focus on rotation of the head and eye blinking, two important cues for determining driver alertness, to make determination of the driver's vigilance level. Our head tracker consists of tracking the lip corners, eye centers, and side of the face. Automatic initialization of all features is achieved using color predicates and a connected components algorithm. A connected component algorithm is one in which every element in the component has a given property. Each element in the component is adjacent to another element either by being to the left, right, above, or below. Other types of connectivity can also be allowed. An example of a connected component algorithm follows: If we are given various land masses, then one could say that each land mass is a connected component because the water separates the land masses. However, if a bridge was built between two land masses then the bridge would connect them into one land mass. So a connected component is one in which every element in the component is accessible from any other element in the component.

For the invention, the term "Occlusion" of the eyes and mouth often occurs when the head rotates or the eyes close, so our system tracks through such occlusion and can automatically reinitialize when it mis-tracks. Also, the system performs blink detection and determines 3-D direction of gaze. These are necessary components for monitoring driver alertness.

The novel method and system can track through local lip motion like yawning, and presents a robust tracking method of the face, and in particular, the lips, and can be extended to track during yawning or opening of the mouth.

A general overview of is the novel method and system for daytime conditions is given below, and can include the following steps:

1. Automatically initialize lips and eyes using color predicates and connected components.
2. Track lip corners using dark line between lips and color predicate even through large mouth movement like yawning
3. Track eyes using affine motion and color predicates
4. Construct a bounding box of the head
5. Determine rotation using distances between eye and lip feature points and sides of the face
6. Determine eye blinking and eye closing using the number and intensity of pixels in the eye region
7. Determine driver vigilance level using all acquired information.

The above steps can be modified for night time conditions.

The invention uses various methods to compute feature points, rotation, blinking and driver alertness. The invention performs in a variety of environments with different drivers. To develop accurate results(ground truth) we looked at the video sequences. Whenever the driver closed his eyes, we counted it as an eye closure. It didn't matter if the driver closed his eyes for one frame or twenty frames, it counted as one eye closure. And we tallied the number of eye closures the program detected for the whole sequence over the total number of eye closures counted in ground truth in column over three. We recorded the total number of frames the driver had his eyes closed for the whole video sequence in column four (ground truth).

The novel invention can provide quick substantially real-time monitoring responses. For example, driver vigilance can be determined within as low as approximately 20 frames, which would be within approximately $\frac{2}{3}$ of a second under some conditions(when camera is taking pictures at a rate of approximately 30 frames per second). Prior art systems usually require substantial amounts of times, such as at least 400 frames which can take in excess of 20 seconds if the camera is taking pictures at approximately 30 frames per second. Thus, the invention is vastly superior to prior art systems.

The video sequences throughout the invention were acquired using a video camera placed on a car dashboard. The system runs on an UltraSparc using 320×240 size images with 30 fps video. Two drivers were tested under different daylight conditions ranging from broad daylight to parking garages. Some video sequences were recorded in moving vehicles and others in stationary vehicles. An onboard computer was and can be used with the invention. Applications of using the invention in different fields will be later described in reference to FIGS. 36–39.

A preferred method of using the novel invention will now be described in reference to FIGS. 1–35.

Referring to FIG. 1, the system will first determine day or night status, step 10. It is nighttime if: a camera clock time period is set for example to be between 18:00 and 07:00 hours. Alternatively, day or night status can be checked if the driver has his night time driving headlights on by wiring the system to the headlight controls of the vehicle. Additionally, day or night status can be set if the intensity of the image, is below a threshold. In this case then it must be dark. For example, if the intensity of the image (intensity is defined in many ways, one such way is the average of all RGB(Red, Green, Blue) values) is below approximately 40 then the nighttime method could be used. The possible range of values for the average RGB value is 0 to approximately 255, with the units being arbitrarily selected for the scale.

If day time is determined then the left side of the flow chart depicted in FIG. 1 will follow. At 100, then first initialize to find face, 110. A frame is grabbed from the video output, 120. Tracking of the feature points is performed in steps 130–150. Measurements of rotation and orientation of the face occurs in steps 160–170. Eye occlusion such as blinking and eye closure is examined, 180. Determining if yawning occurs in step 190. The rotation, eye occlusion and yawning in formation is used to measure the driver's vigilance in 300. Appropriate warning are displayed in 300 as well. All of the steps 100 through 190 will be described in detail in reference to FIGS. 2–21.

Referring to FIG. 1, if night time is determined, 200, then the right flow chart series of steps occurs, by first initializing to find the face, 210. Next a frame is grabbed from the video output, 220. Tracking of the lip corners and eye pupils is performed in steps 230–250. Measure rotation and orientation of face in 260–270. The feature points are corrected if necessary in step 275. Eye occlusion such as blinking and eye closure is examined for in step 280. Determining if yawning is occurring is done in step 290. The rotation, eye occlusion and yawning steps in formation is used to measure the driver's vigilance in 300. Appropriate warning are displayed in 300 as well. A more detailed description of the night time flow chart steps will be described later in reference to FIGS. 22–34.

DAYTIME CONDITIONS

Figure 2:
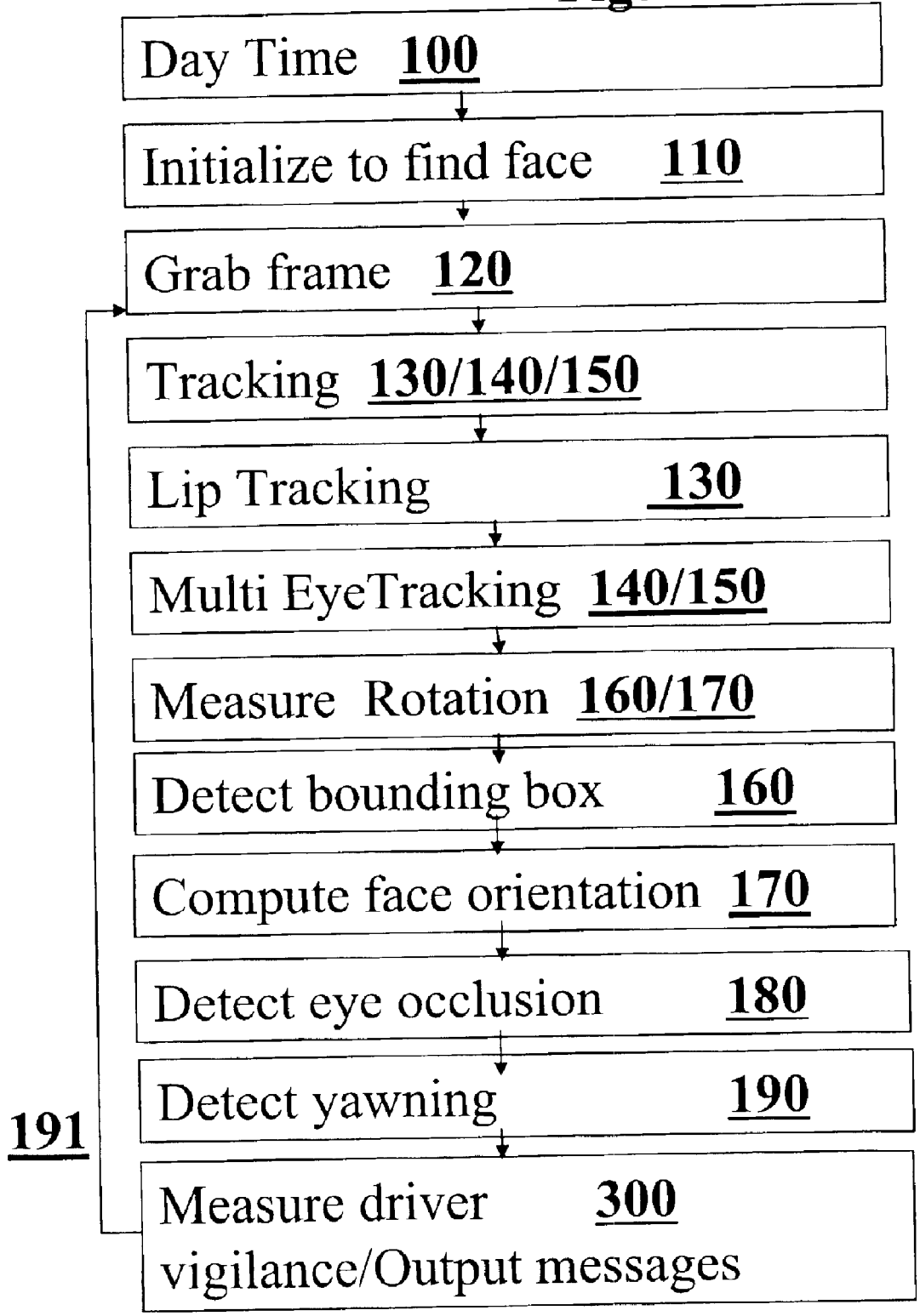
FIG. 2 is a detailed flowchart for the day time tree portion of the flow chart of FIG. 1.

Referring to FIG. 2 gives more detail of the steps 100–190 for the daytime scenario depicted in FIG. 1. In step 110, initialization is performed to find the face feature points. A frame is taken from a video stream of frames in 120. Tracking is then done in stages. Lip tracking is done in 130. There are multiple stages in the eye tracker. Stage 1, 140, and Stage 2, 150, operate independently. A bounding box around the face is constructed, 160, and then the facial orientation can be computed in step 170. Eye occlusion is determined in 180. Yawning is detected in 190. The rotation, eye occlusion, and yawning information is fused in step 300, to determine the vigilance level of the operator. This is repeated by, 191 which allows the method and system to grab another frame from a video stream of frames and continue through the following steps 130–190 again. A more detailed description of these steps will now be described in FIGS. 3–21.

Referring to FIG. 3, the system initializes itself in step 110. The lip and eye colors ((RED, BLUE, GREEN)RGB) are marked in the image offline, 111. The colors in the image are marked to be recognized by the system. Mark the lip pixels in the image is important. All other pixel values in the image are considered unimportant. Each pixel has an Red (R), Green)G), and Blue(B) component. For a pixel that is marked as important, go to this location in the RGB array indexing on the R, G, B components. This array location can be incremented by equation (1):

$$\exp(-1.0*(j*j+k*k+i*i)/(2*\text{sigma}*\text{sigma}));\qquad(1)$$

where: sigma is approximately 2;

j refers to the component in the y direction and can go from approximately −2 to approximately 2;

k refers to the component in the z direction and can go from approximately −2 to approximately 2;

i refers to the component in the x direction and can go from approximately −2 to approximately 2.

Thus simply increment values in the x, y, and z direction from approximately −2 to approximately +2 pixels, using the above function. As an example running through equation (1), given that sigma is 2, let i=0, j=1, and k=−1, then the function evaluates to exp(−1.0*(1+1+0)/(2*2*2))=exp(−1*2/8)=0.77880, where exp is the standard exponential function ($e^x$).

Equation (1) is run through for every pixel that is marked as important. If a color, or pixel value, is marked as important multiple times, its new value can be added to the current value. Pixel values that are marked as unimportant can decrease the value of the RGB indexed location via equation (2) as follows:

$$\exp(-1.0*(j*j+k*k+i*i)/(2*(\text{sigma}-1)*(\text{sigma}-1))).\qquad(2)$$

where: sigma is approximately 2;

j refers to the component in the y direction and can go from approximately −2 to approximately 2;

k refers to the component in the z direction and can go from approximately −2 to approximately 2;

i refers to the component in the x direction and can go from approximately −2 to approximately 2.

Thus simply increment values in the x, y, and z direction from approximately −2 to approximately +2 pixels, using the above function. As an example running through equation (1), given that sigma is 2, let i=0, j=1, and k=−1, then the function evaluates to exp(−1.0*(1+1+0)/(2*1*1))=exp(−1*2/2(=0.36788, where exp is the standard exponential function ($e^x$).

The values in the array which are above a threshold are marked as being one of the specified colors. The values in the array below the threshold are marked as not being of the specified color. An RGB(RED, GREEN BLUE) array of the lip colors is generated, and the endpoints of the biggest lip colored component are selected as the mouth corners, 112.

The driver's skin is marked as important. All other pixel values in the image are considered unimportant. Each pixel has an R, G, B component. So for a pixel that is marked as important, go to this location in the RGB array indexing on the R, G, B components. Increments this array location by equation (1) given and explained above, it is both written and briefly described here for convenience: exp(−1.0*(j*j+k*k+i*i)/(2 *sigma*sigma)); sigma is 2. Increment values in the x, y, and z direction from approximately −2 to approximately +2, using equation 1. Do this for every pixel that is marked as important. If a color, or pixel value, is marked as important multiple times, its new value is added to the current value.

Pixel values that are marked as unimportant decrease the value of the RGB indexed location via equation (2), given and explained above, and is both written and briefly described here for convenience: exp(−1.0*(j*j+k*k+i*i)/(2*(sigma−1)*(sigma−1))). The values in the array which are above a threshold are marked as being one of the specified colors. Another RGB array is generated of the skin colors, and the largest non-skin components above the lips are marked as the eyes, 113. The program method then starts looking above the lips in a vertical manner until it finds two non-skin regions, which are between approximately 15 to approximately 800 pixels in an area. The marking of pixels can occur automatically by considering the common color of various skin/lip tones.

Figure 4:
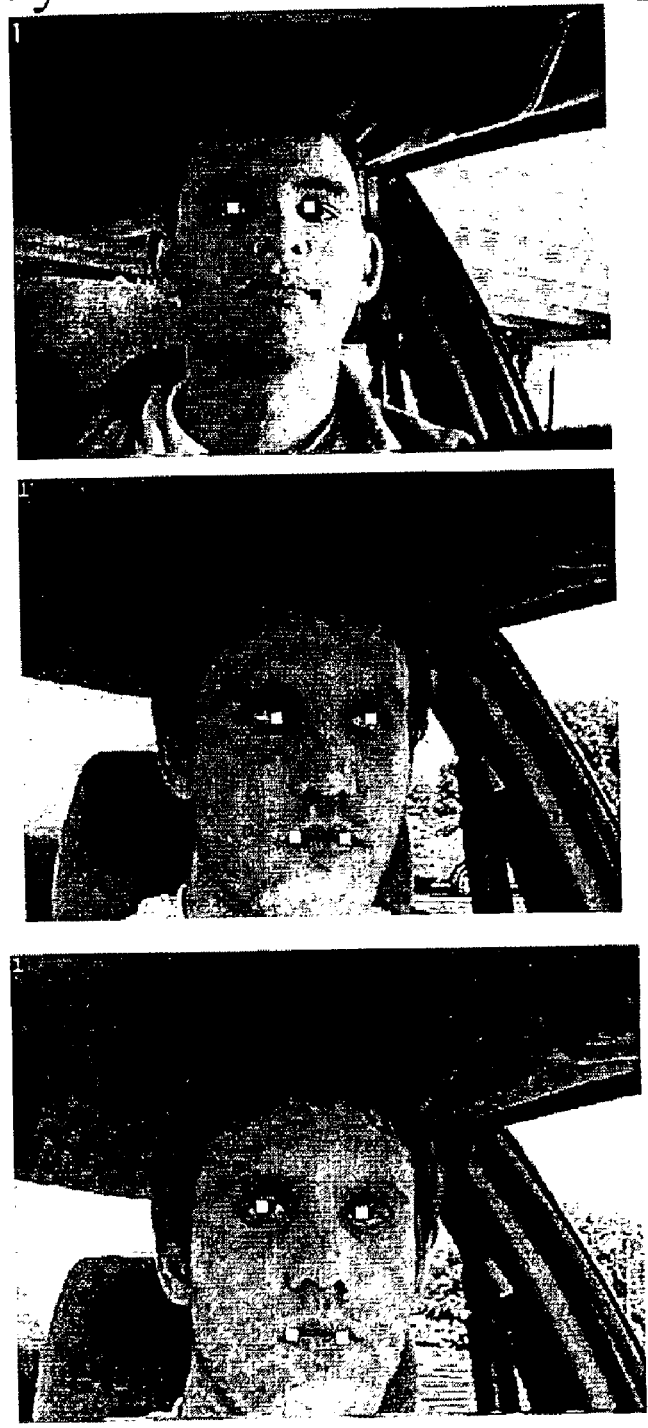
FIG. 4 are visual images illustrating initialization.

FIG. 4 illustrates visual images of the results of initialization. These images show that the presented method is able to take input images of faces and robustly and automatically determine where the eyes and lips are. When looking at the images one can see that the initialization method described here works.

Figure 5:
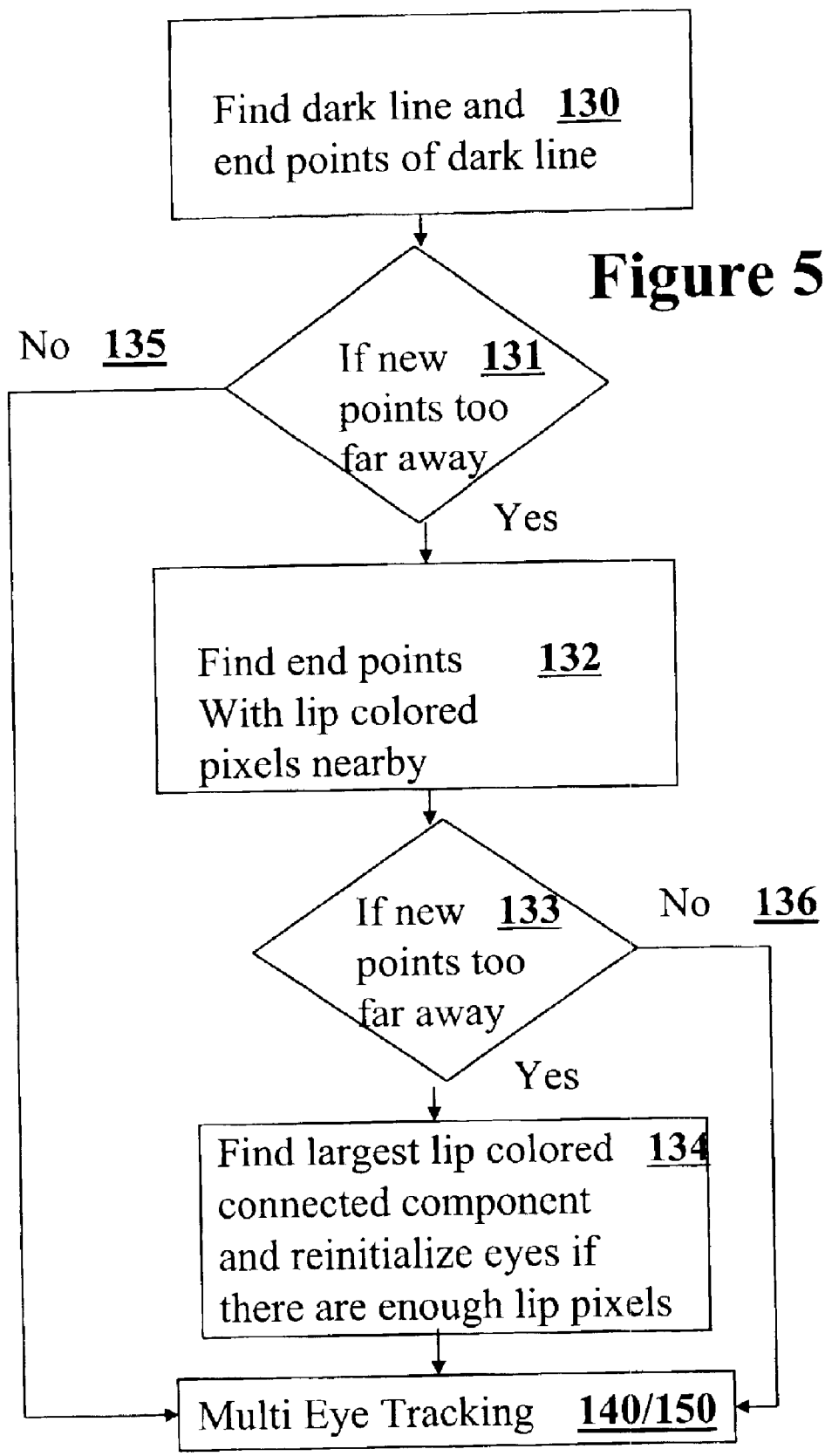
FIG. 5 is a flow chart of the lip tracking steps for FIGS. 1–2.

Referring to FIG. 2, then the next frame is acquired in step 120(FIGS. 1, 5).

Referring to FIG. 5, the system will find the endpoints of the dark line, 130. Go to the center of the mouth. For each side examine each pixel outward from the lip center using the equation (3) below:

$$(R+G+B)/3 \qquad (3)$$

where: R is the intensity of the R component of light ranging from 0 to approximately 255 for the particular pixel being analyzed; (Of course this in no way means that the RGB color space must be used or that only 256 values can be used).

G is the intensity of the G component of light ranging from 0 to approximately 255 for the particular pixel being analyzed;

B is the intensity of the B component of light ranging from 0 to approximately 255 for the particular pixel being analyzed.

Running through equation (3), with the values R=10, G=200, G=30 (this color will be a greenish color), gives us (10+200+30)/3=80 for the intensity of this pixel.

For each pixel consider a vertical line and find the darkest pixel on this vertical line, which will usually be on the dark line between the lips. Extend this line for approximately 35 pixels in both directions. To determine which of these dark pixels is the actual lip corner maximize a function given by equation (4) which relates distance from the lip corner and the brightness of the pixel.

$$f(x)=1/\text{Brightness}+1/\text{DistanceFromPreviousLipCorner.} \qquad (4)$$

where: Brightness is the value of equation(3) for each pixel and can range from 0 to approximately 255; and DistanceFromPreviousLipCorner is the distance of this possible endpoint from the endpoint of the previous lip corner, and will generally be in the range 0 to approximately 20 pixels.

Assuming a Brightness=40, and DistanceFromPreviousLipCorner=5, then f(x)=1/40+1/5= 0.225

Referring to FIG. 5, next, the points are tested for feasibility, 131. If the point are feasible then this means they are not too far away, so no additional computations are needed in the lip tracking stage. Thus control will pass on to the 140/150 stage by taking the 135 path. If the points computed are not feasible then control passes to the next level of lip tracking, which will do more analysis as to where the lip corners are, 132. In stage 132 the end points with lip colored pixels are selected in 132, if 131 fails(new points are too far away). These new points are then tested for feasibility, 133, in a way similar to that in 131.

Basically, feasibility occurs when the newly computed lip corners are close in pixel distance units to the previous frame's computed lip corners. This kind of idea makes sense because the video data is 30 frames per second, so the lip/mouth motion between individual frames should be relatively small.

If the test fails then the endpoints of the largest lip component are selected as lip corners, 134. If there are not many lip pixels in the image, assume that massive occlusion is occurring. Massive occlusion means that the camera is either not able to see the driver's facial features—lip corners and eye centers or that the facial features are barely visible to the camera. This can occur when the driver rotates his head so much that the eyes and lips fall outside the field of view of the camera. It could also happen if the hands or some other object was obstructing the driver's face.

Next the system finds the largest red connected component when there are enough lip pixels. If there are very few lip pixels in the image, the system will reinitialize both the mouth and eyes when the number of lip pixels reaches an acceptable level. During this time when there are not enough lip pixels in the image, there is assumed to be occlusion of some kind. Then multi eye tracking steps 140–150 are performed.

Figure 6:
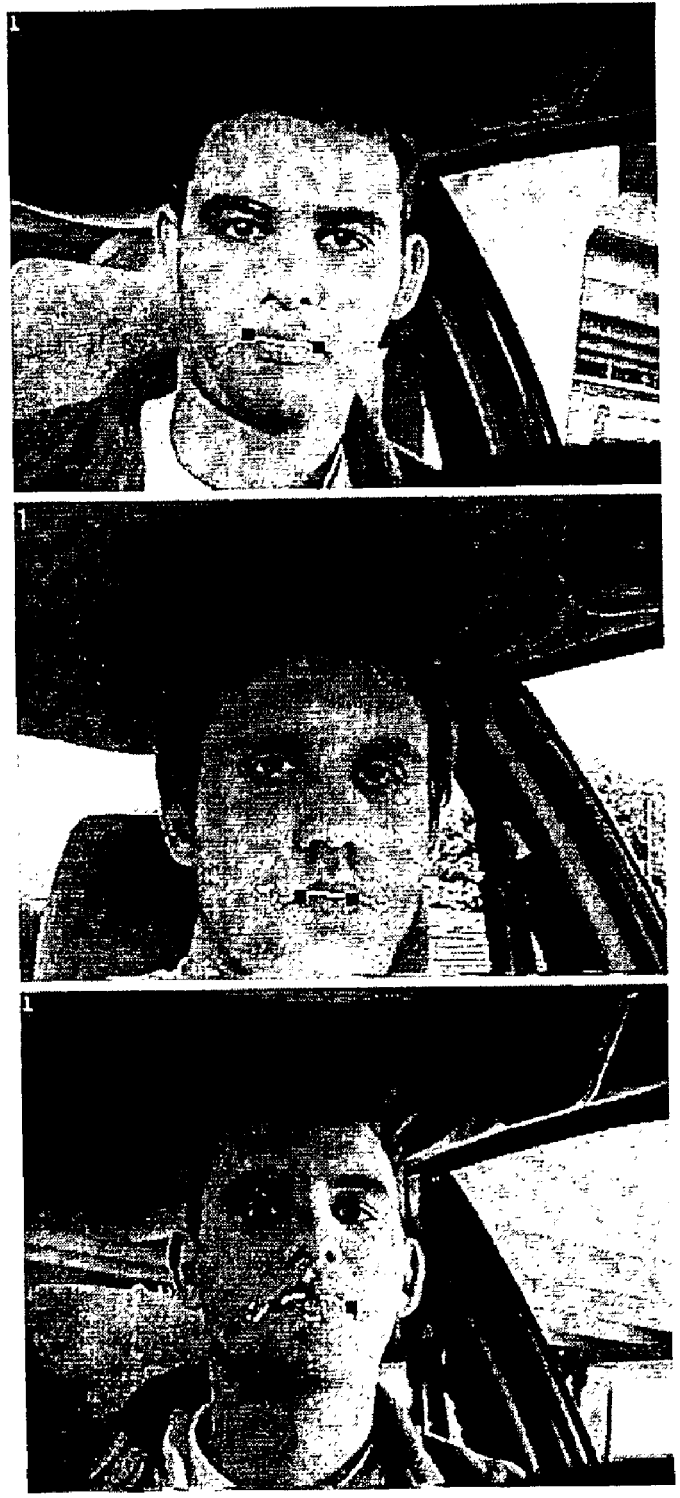
FIG. 6 are visual images illustrating lip tracking.

FIG. 6 illustrates visual images of the results of the lip tracking. These images show that the presented method is able to take input images of faces and robustly and automatically perform lip tracking. When looking at the images one can see that the tracking method successfully marks the lip corners.

Figure 7:
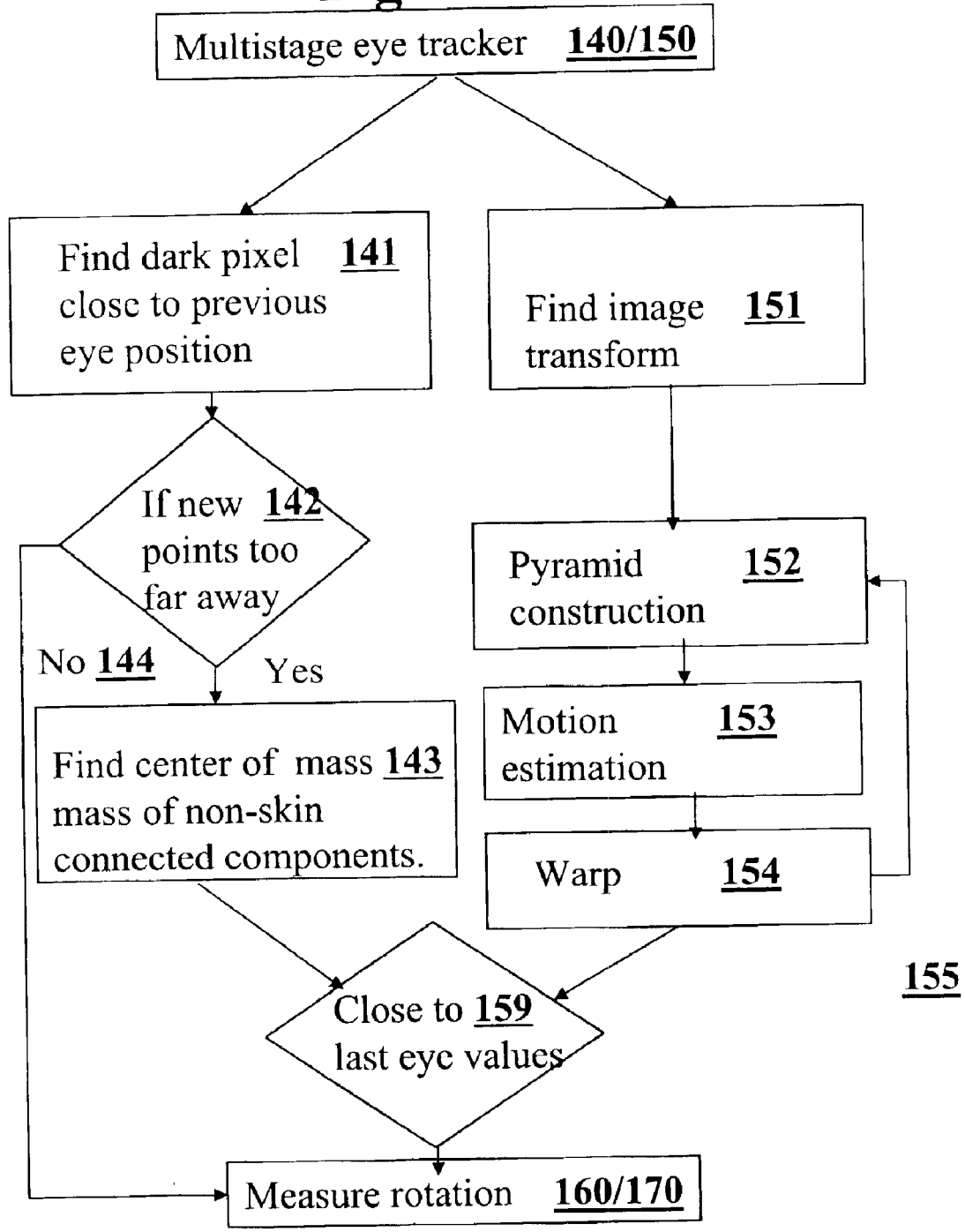
FIG. 7 is a flow chart of the multistage eye tracker steps of FIGS. 1–2.

FIG. 7 is a flow chart of the multistage eye tracker steps of FIGS. 1–3 and 5. Referring to FIG. 7 the system runs two independent subsystems, 140, 150. First a dark pixel is located close to a previous eye position, 141. The system goes to the eye center of the previous frame and finds the center of mass of the eye region pixels, which are the non-skin colored pixels as defined above. In approximately a 5×5 pixel window around this center of mass, look for the darkest pixel, which corresponds to the pupil. This estimate is tested to see if it is close enough to the previous eye location, 142. If the computed new eye points are not too far away then the 144 branch is taken, which bypasses step 143. Basically, feasibility occurs when the newly computed eye centers are close in pixel distance units to the previous frame's computed eye centers. This kind of idea makes sense because the video data is 30 frames per second, so the eye motion between individual frames should be relatively small.

If new points are too far away, the system goes to step 143, which searches a window around the eyes and finds all non-skin connected components in approximately a 7×20 pixel window, and finds the slant of the line between the lip corners using equation (5). This This equation finds the slope between two points in general.

$$((y_2-y_1)/(x_2-x_1)) \qquad (5)$$

where: $x_1,y_1$ is the coordinate of a feature; and $x_2,y_2$ is the coordinate of the other corresponding feature.

Each of these values in equation (5) can be in the range of the size of the image in the respective direction. Running through an example, suppose $x_1=4, y_1=8$, and $x_2=9, y_2=2$, then the slope will be: $(2-8)/(9-4)=-6/5$.

The system selects the eye centroids that have the closest slant to that of the slant between the lip corners using equation (5). These two stages are called the eye black hole tracker.

The second subsystem in FIG. 7 finds the image transform, 151. This stage tries to find a common function between two images in which the camera moved some amount. This function would transform all the pixels in one image to the corresponding point in another image. This function is called an affine function. It has six parameters, and it is a motion estimation equation. Finding this function, requires following the below steps. In the first step is pyramid construction, 152. Use a 1 dimensional mask initialized to mask[0]=0.25–0.4/2.0; mask[4]=0.25–0.4/2.0; mask]1]=0.25; mask[3]=0.25; mask[2] =4; In this case the mask has 5 elements, but another number of elements in the mask could be used. Once the mask is initialized each mask location can be multiplied with a corresponding image pixel around the current pixel. This is a convolution operation given by equation (6):

$$\text{image} ** \text{mask} \tag{6}$$

where:image is the RGB image, with RGB values between 0 and approximately 255; Mask is the above mask.

A 1-Dimensional (1-D) convolution example follows. Assume the pixel values are [1 2 3 4 5] then the result of the convolution is: 1*(0.25−0.4/2.0)+2*0.25+3*0.4+4*0.25+5*(0.25−0.4/2.0).

It is important to note that other numbers could also be used in the mask. This function in equation (6) can be applied to 5 pixels in the row, with i going from −2 to 2.

As already stated the mask could be a different size. Mask location mask[2], or i=0, is the midpoint. First do the mask application vertically. The 1-D mask is applied to alternate columns of the image. This results in an image with the same width but half the height, call it imageA. Apply the 1-D mask to alternate pixels along each row of imageA, which results in an image that was half the width and half the height as the previous(original) image(before construction of imageA). ImageA is called a pyramid, step 152. Repeat the above process approximately three times, resulting in a stack of images, each reduced in size by half in each dimension. This stack of images is referred to as pyramids(pyramid construction step 152).

Next motion estimation is then performed in step 153. Here assume global motion and use the affine functions given in equations (7) and (8) as follows:

$$u(x,y)=a*x+b*y+c \tag{7}$$

$$v(x,y)=d*x+e*y+f. \tag{8}$$

where: a,b,c,d,e and f are the motion parameters and are generally small numbers whose absolute values are less than 5;

x and y are the current coordinates of the pixel and thus there range is the image size.

Equations (7) and (8) are straightforward additions and multiplications. Minimize this motion estimation function over the whole image at the highest level of the pyramid. Next we can construct an error function using equations (9) and (10) as follows.

$$U(X)=<u(x,y) \; v(x,y)>=X(x)a, \text{ where } X=a2\times6 \text{ matrix}=|x \; y \; 1 \; 0 \; 0 \; 0| \; |0 \; 0 \; 0 \; x \; y \; 1| \text{ and } a=[a \; b \; c \; d \; e \; f]^T$$

$$Error(del(a)) = \sum_x (f_i + f_x^T \delta U)^2,$$

is based on the function $$f_x u + f_y v = -f_t \tag{10}$$

where: the Error is the error measuring function, given delta a; Delta a is the change in the motion parameters a, . . . f.

Equation (10) is a general optical flow equation, which relates two frames close in time to one another, where:
u and v are the velocities (in pixel units) of the point (x,y);
$f_x$ is the derivative of the image in the x direction;
$f_y$ is the derivative of the image in the y direction;
$f_t$ is the derivative of the current image with the previous image. This can be visualized as subtracting one image from the other.

The values for the derivatives will be in pixel units as well, and generally won't be larger than 20–30, but could be as high as 100 or more.

Following the pyramid construction step 152, the warping, step 154 occurs. For image warping, here we use bilinear interpolation to get the four points which are closest to (x,y). The point (x,y) is the point which corresponds to the point in the target image.

We use error measures to get the pixel at time t based on an average of the four closest values, from time t−1. This process is repeated to improve the transform, 155, using a method called Coarse to fine refinement: integrate these new motion parameters into the current motion parameters, to get a better estimate of the motion. Steps 152–154 are repeated as can be seen with the loop back at 155. The loop is taken three times. Send these motion parameters to the next lower level of the pyramid, updating the motion parameters for this level with the higher level motion parameters. When done with all iterations at all levels, these values are the affine parameters. To get the new eye location use these motion parameters and warp the previous eye center with the inverse of these parameters and see where the new eye center is. For the eye tracking purposes we use subimages and not whole images. The subimage to use is a window around each eye in the current image. Go to the next image, and create a subimage with the same position, respectively for each eye. The necessary parameters are computed for each eye from the current to the next subimage. Each eye has its own function, which is used to estimate the location of the eye in the next frame.

Referring to FIG. 7, the results of each subsystem (141–143, and 151–154) are then fused together in step 159 which will now be described. Here, the eye tracker takes an average of the two estimates (eye black hole tracker and the anandan tracker). The eye black hole tracker being stages 140–144, which essentially looks for the darkest pixels in the eye region and declares these the pupils, doing a connected component analysis if this fails. The anandan tracker finds the image transform between the two images and is 151–155.

If the distance between the eyes get to more than approximately ¼ the horizontal image size or when the lips appear after heavy occlusion, the program looks for the non-skin colored regions. It does this by looking at the value of each pixel, and if it is a skin pixel, it is not considered to be part of a non-skin region. A connected component algorithm is run and it finds the non-skin contiguous regions. An example of a connected component algorithm follows: If we are given various land masses, then one could say that each land mass is a connected component because the water separates the land masses. However, if a bride was built between two land masses then the bridge would connect them into one land mass. So a connected component is one in which every element in the component is accessible from any other element in the component.

The program starts looking above the lips in a vertical manner until it finds two non-skin regions, which are between approximately 15 to approximately 800 pixels in area. It takes as the two eye positions. Then rotation of the head is measured, 160–170.

Figure 8:
FIG. 8 are visual images illustrating results of whole head tracker steps.

FIG. 8 illustrates visual images of the results of the whole head tracker. These images show that the presented method is able to take input images of faces and robustly and automatically track the eyes and lips. When looking at the images one can see that the tracking method described here works.

Figure 9:
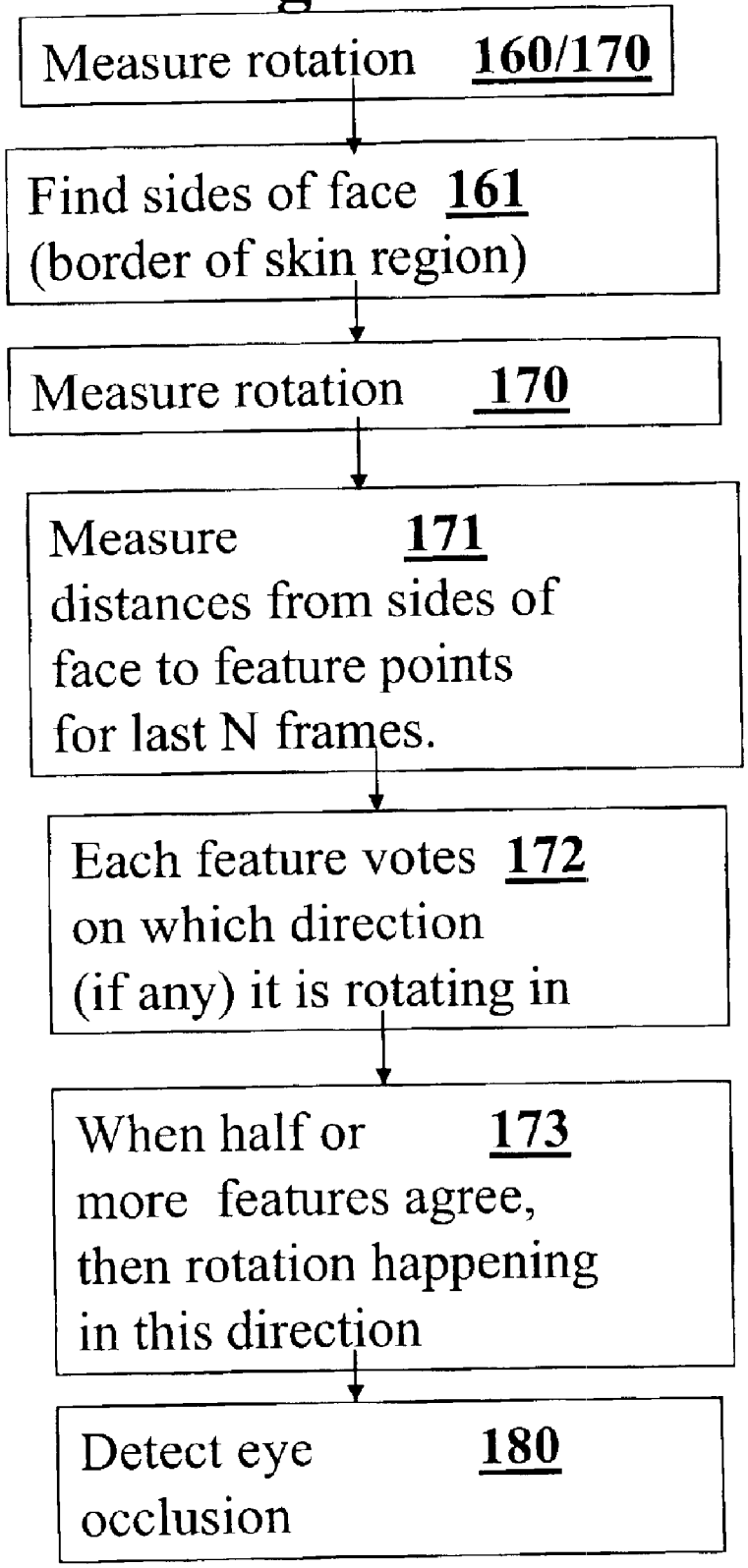
FIG. 9 is a flow chart of the measure rotation steps of FIGS. 1–2.

Referring to FIG. 9, the system now finds the sides of the face(border region), 161. Here, we construct a bounding box around the face, average the eye centers and lip corners to get the center of the face. We start the search going out a fixed distance from the center of the face and looking inward finding the first five consecutive skin pixels, though another number could be used without loss of generality. This point is considered to be the side of the face. We do this for every row in the image. Next we average all side of face positions for each (curved) side of the face. To measure rotation, 170, the distances from sides of face to feature points are measured, 171, and we take the derivative of these measurements over time using equation (11).

$$\text{sign}(x-y) \tag{11}$$

where: the sign function returns the sign of the argument;

x refers to the value of this particular side of face, which can range between 0 to approximately 255;

y refers to the feature point in question, which can also range between 0 to approximately 255.

There is only one dimension involved here because a side of the face has one coordinate constant, and in relation to a feature point there is only a non-trivial derivative in one dimension (either x or y). So suppose x=20, and y=23, then sign(20–23)=−1, since the sign only outputs whether the resulting derivative was positive or negative. Since 20–23 is negative a −1 is output.

And consider(store) only the direction of the derivative. So for the rotation analysis the method looks at the sign and not the magnitude of the derivative. Thus, 20–23=−3, but our method only considers the sign (whether the substraction is positive or negative), so −1 would be recorded. Similarly, 23−20=3, but the method only stores the sign of the derivative, which is 1, since the result is positive.

Referring to FIG. 9, the voting step 172 happens next. A feature indicates rotation in the respective direction based on whether the direction of the derivative is positive or negative. A direction of zero indicates no rotation in either direction. When more than half of the distances of a particular feature indicate rotation in some direction, this feature is assumed to be involved in head rotation. Each feature independently determines if it is involved in rotation. Further each feature has two degrees of freedom(horizontal and vertical). When half (out of four) or more features indicate rotation in a particular direction the system declares rotation is happening in this direction. The system then decides if rotation is happening, 173, based on the voting information. Finally, the last step in sequence occurs and eye occlusion is detected next, 180.

Figure 10:
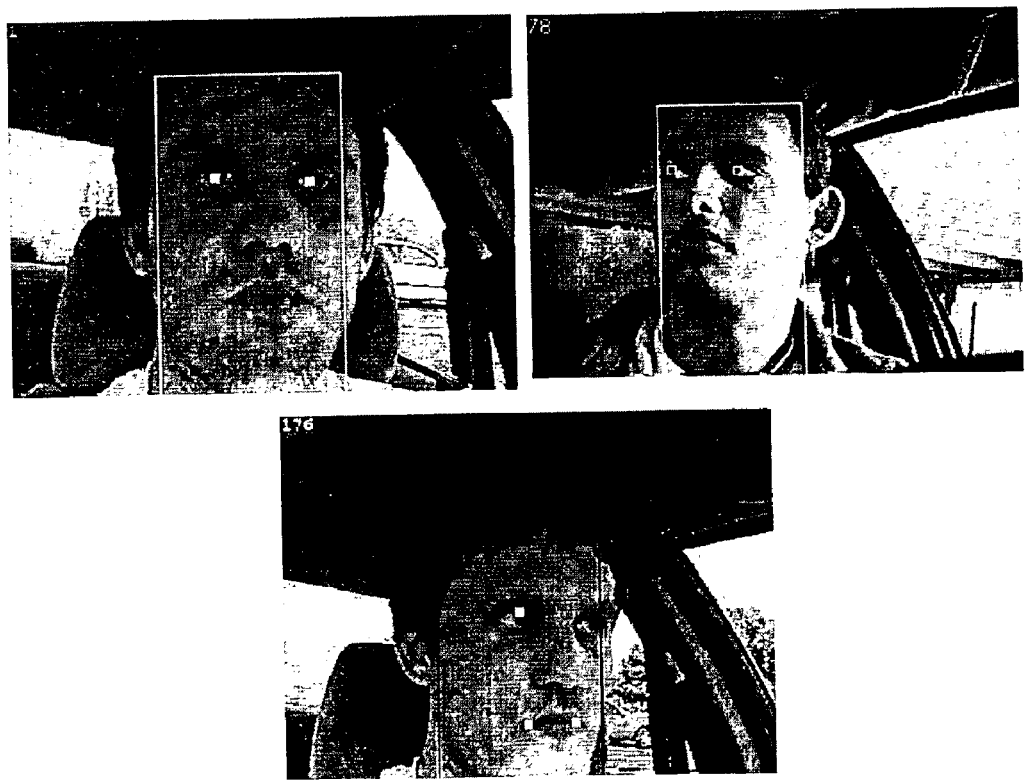
FIG. 10 are visual images illustrating detection of the bounding box of FIG. 4.

FIG. 10 illustrates the visual images of the results of bounding box/rotation. These images show that the presented method is able to take input images of faces and robustly and automatically determine the boundaries of the face. When looking at the images one can see that the boundary detection method described here works.

The detecting of eye occlusion 180(FIGS. 1–2) will now be described.

Figure 11:
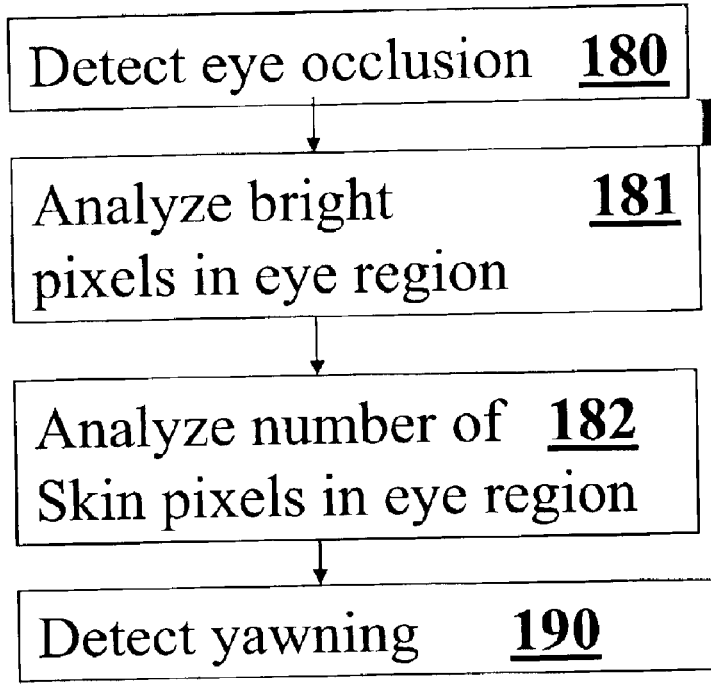
FIG. 11 is a flow chart of the detect eye occlusion steps of FIG. 1–2.

Referring to FIG. 11 bright regions are first analyzed, 181. As long as there are eye-white pixels in the eye region the eyes are open. If not blinking is happening. To determine what eye-white color is, in the first frame of each sequence we find the brightest pixel in the eye region and use this as the eye white color. Skin pixels are analyzed next, 182, to determine if eyes are occluded. When the number of skin pixels in the eye region increases to approximately more than 4/5 of the size of the eye region rotational eye occlusion is happening.

The detecting yawning 190(FIGS. 1–2) will now be described.

Figure 12:
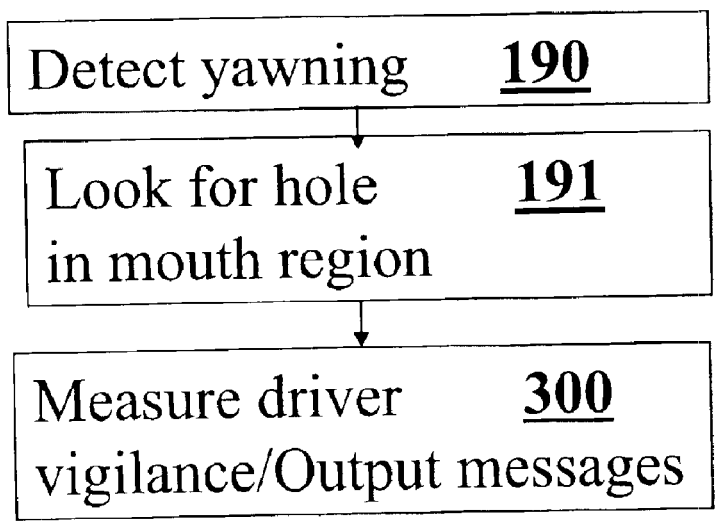
FIG. 12 is a flow chart of the detect yawning steps of FIGS. 1–2.

Referring to FIG. 12, the system looks for a hole in the mouth region, 191 of the image to detect yawning. The system goes to a point in between the two mouth corners, and looks on a vertical line approximately 10 pixels below and approximately 30 pixels above the midpoint. If there are more than approximately 25 non-skin pixels on this vertical line, the mouth has opened, which is a yawn. Then driver vigilance is determined in step 300.

FIG. 13 illustrates the visual images of the results eye occlusion, yawning. These images show that the presented method is able to take input images of faces and robustly and automatically determine both when the eyes close or are occluded from rotation and when yawning occurs. When looking at the images one can see that the detection method described here works.

The measuring of driver vigilance 300(FIGS. 14–21) will now be described.

Figure 14:
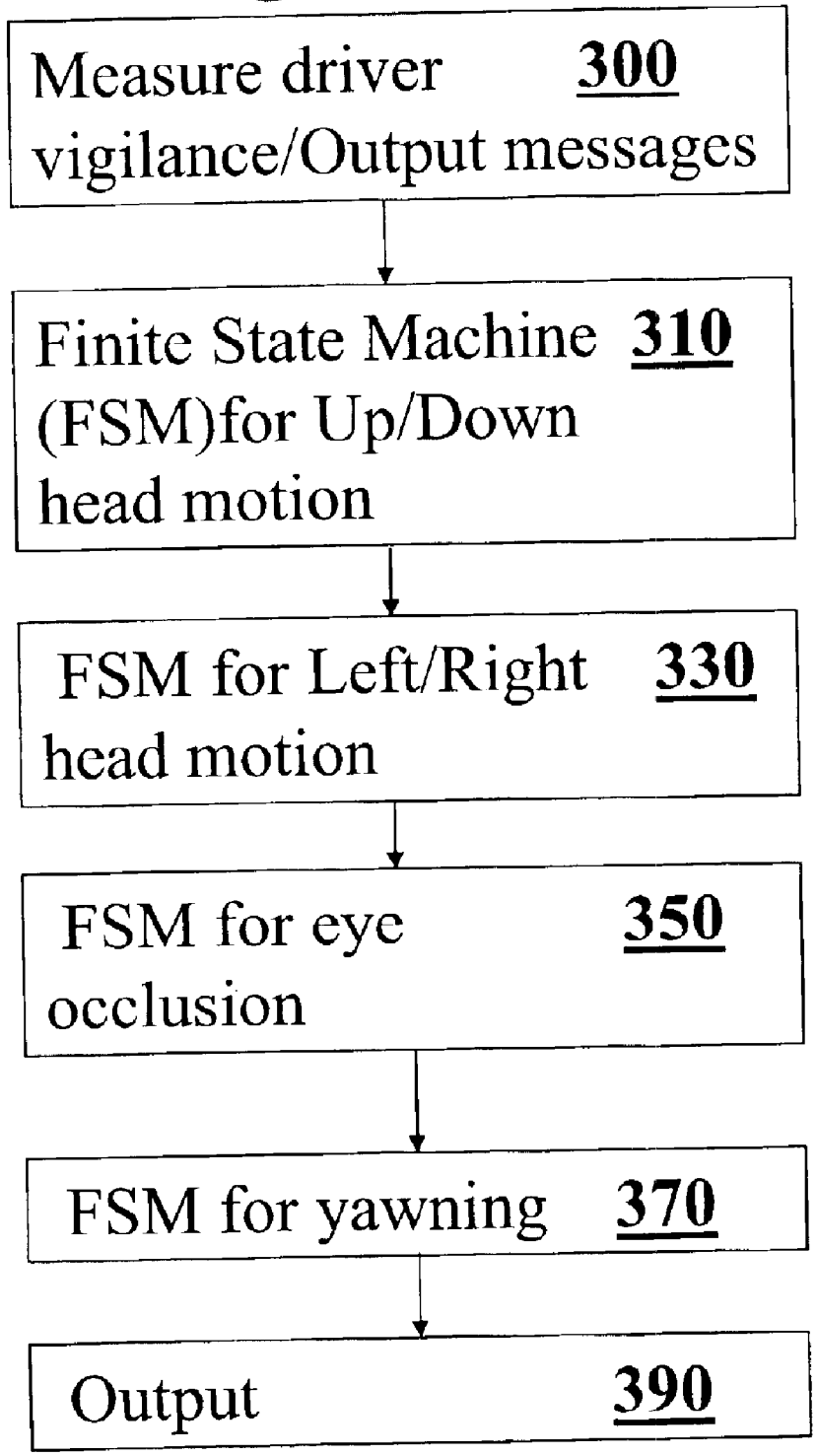
FIG. 14 is a flow chart of the measure driver vigilance steps of FIGS. 1–2.

Referring to FIG. 14, driver vigilance is measured. Although a preferred example is given below, similar other techniques can also be used for determining similar results. First excessive up/down head motion is detected, 310. Excessive left/right head motion is detected next, 330. Excessive eye closure(eye occlusion) is detected, 350. Excessive yawning is detected, 370. The above data is then fused to determine appropriate output messages, 390. A more detailed description of the steps in FIG. 14 will be described in reference to FIGS. 15"21.

Figure 15:
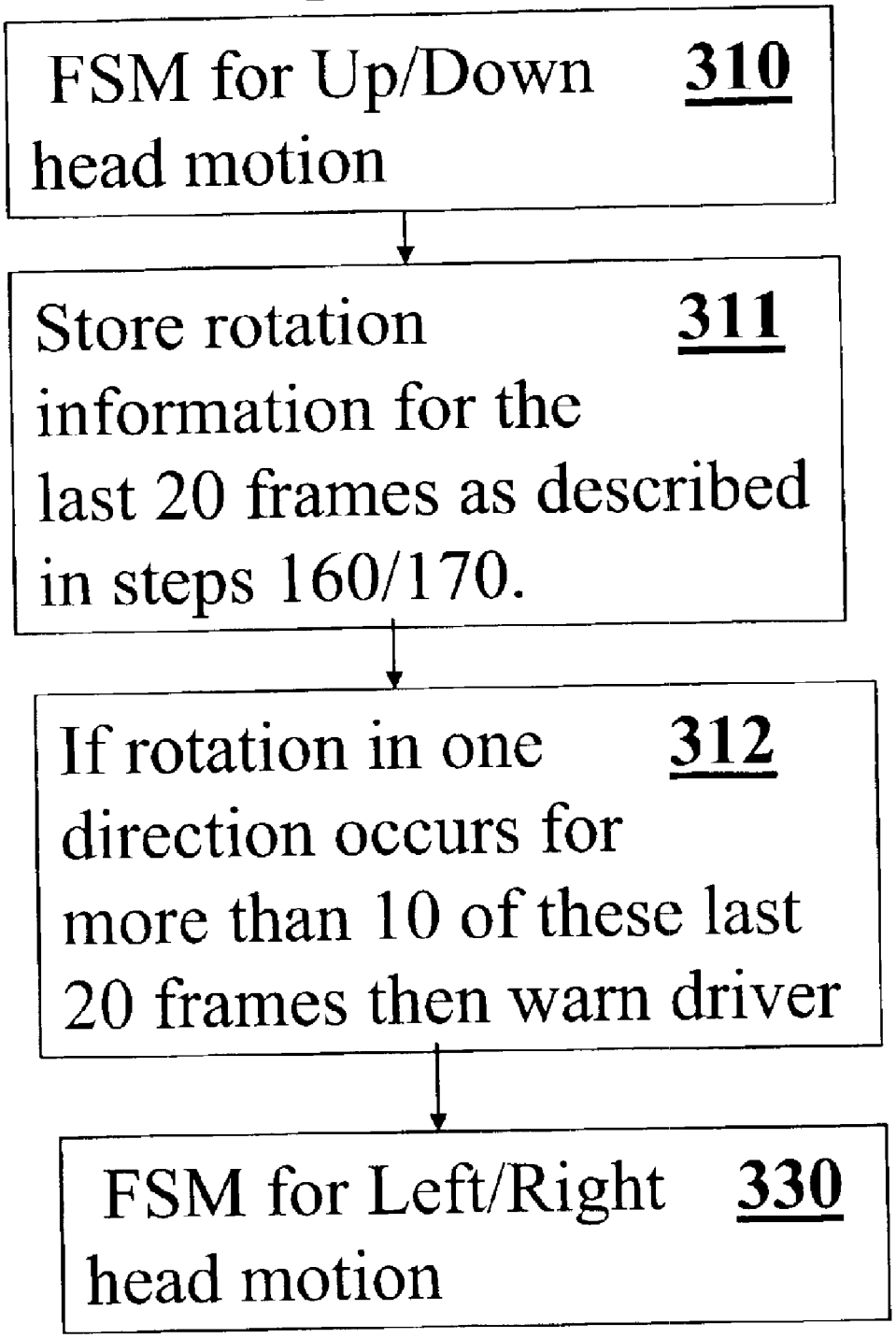
FIG. 15 is a flow chart of the finite state machine(FSM) steps for determining up/down head motion of FIG. 14.

Referring to FIG. 15, rotation information from previous frames is stored, 311(store rotation information for the last approximately 20 frames as was previously described in steps 160/170). Next the system determines if excessive up/down head motion is occurring, 312. If rotation in a single direction occurs for more than approximately 10 out of the last approximately 20 frames the system warns that the driver is not paying adequate attention to the road. Excessive left/right head motion is detected next at step330 (FIGS. 14 and 16).

Referring to FIG. 16, rotation information for previous frames is stored, 331(rotation information is stored for the last approximately 20 frames as previously described in reference to steps 160/170). Next the system determines if excessive left/right head motion is occurring, 332. If rotation in a single direction occurs for more than approximately 10 out of the last approximately 20 frames the system warns that the driver is not paying adequate attention to the road. Excessive eye closure(occlusion) step 350 is detected next (350 FIGS. 14 and 18).

FIG. 17 illustrates the visual images of the results of excessive left/right/up/down head motion detection from FIGS. 15–16. These images show that the present method is able to take input images of faces and automatically determine when excessive rotation occurs. When looking at the images one can see that the excessive rotation detection method described here works.

Figure 18:
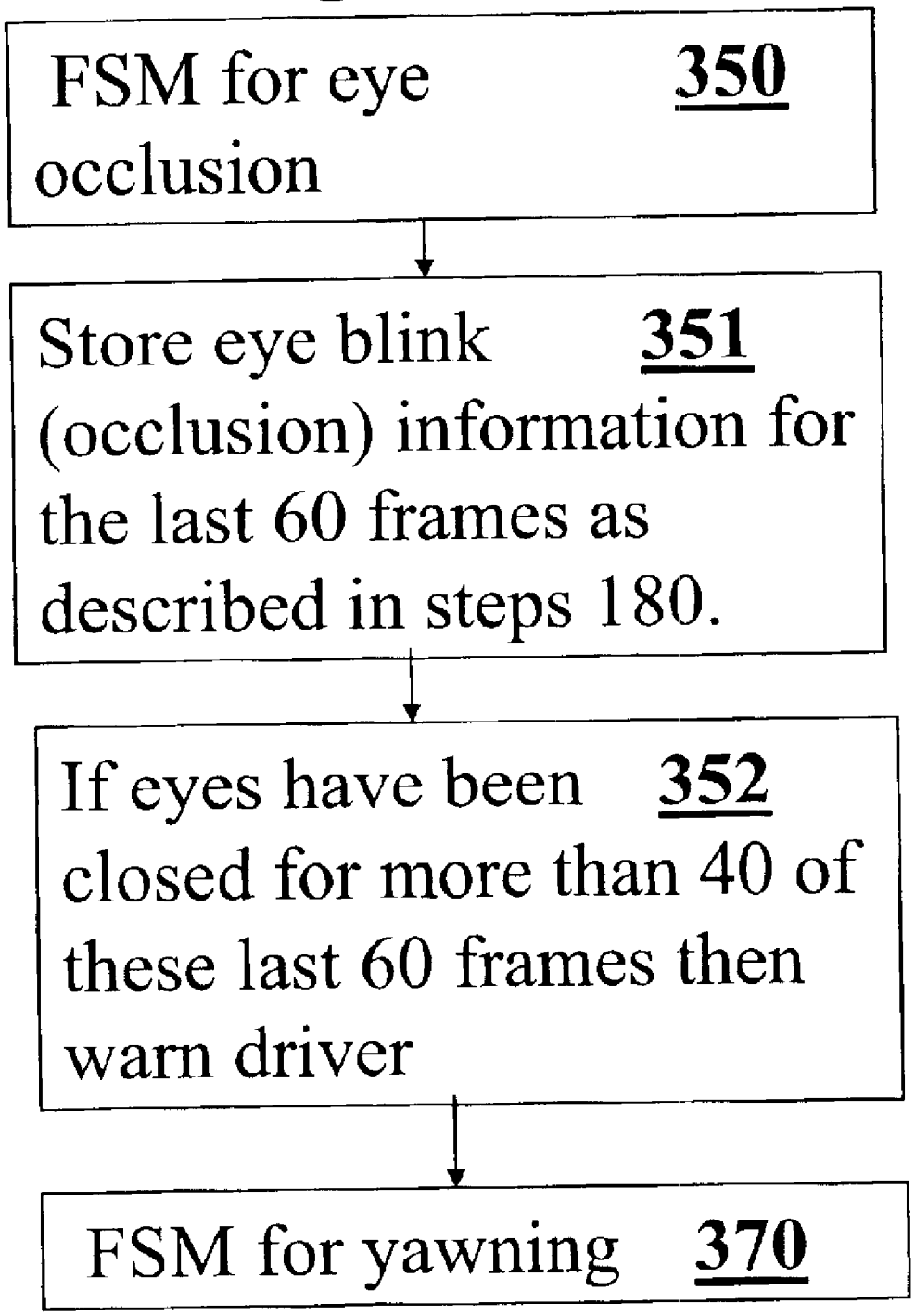
FIG. 18 is a flow chart of the FSM steps for determining eye occlusion of FIG. 14.

Referring to FIG. 18, eye blink(occlusion) information 350 for previous frames is stored, 351. Here the system stores eye blink(occlusion) information for the last approximately 60 frames as previously described in steps 180–182. Next the system determines if eye closure(occlusion) is occurring, 352. If the eyes have been closed for more than approximately 40 of the last approximately 60 frames, the system declares that driver has his eyes closed for too long. Excessive yawning is detected next(step 370 FIGS. 14 and 20).

FIG. 19 illustrates the visual images of the results of excessive eye closure detection of FIG. 18. These images show that the presented method is able to take input images of faces and automatically determine when excessive eye closure occurs. When looking at the images one can see that the excessive eye closure detection method described here works.

Figure 20:
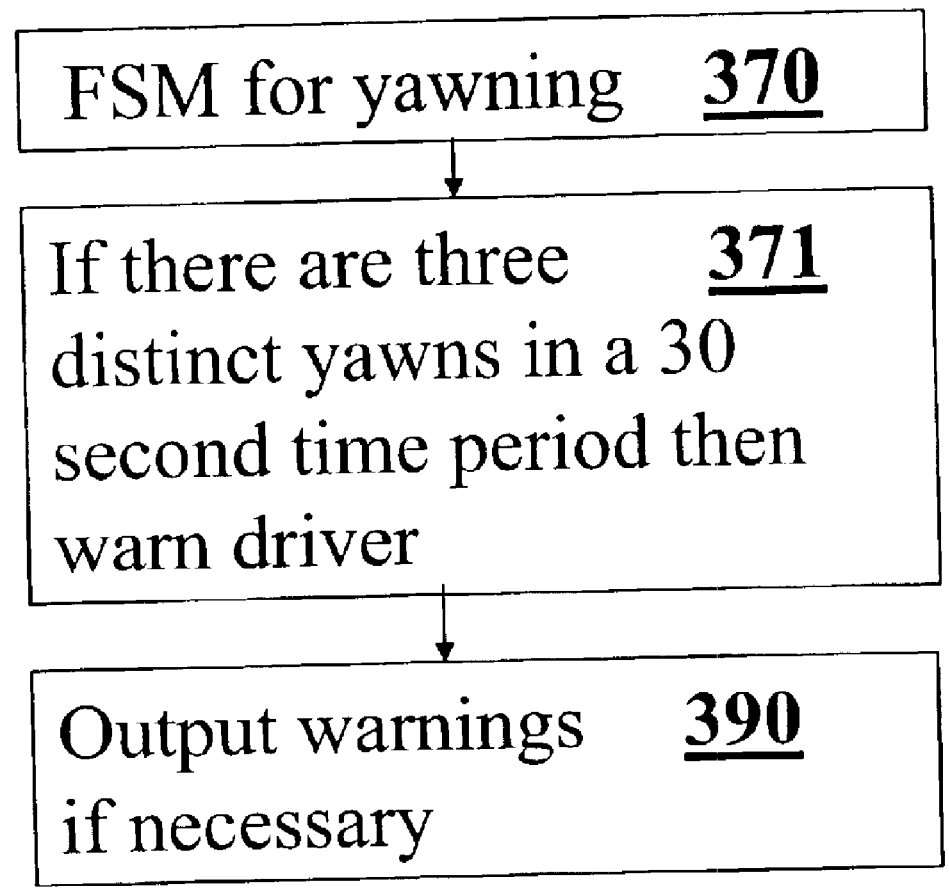
FIG. 20 is a flow chart of the FSM steps for determining yawning of FIG. 14.

Referring to FIG. 20, excessive yawning step 370 is detected in 371. If there are approximately three distinct yawns in a 30 second time period, the system can immediately warn that the driver is drowsy. The system determines if it is necessary to output any warnings at step 390/399 which will be described later in greater detail in reference to FIG. 35.

FIG. 21 illustrates the visual images of the results yawning detection of FIG. 20. These images show that the presented method is able to take input images of faces and automatically determine when excessive yawning occurs. When looking at the images one can see that the excessive yawning detection method described here works.

NIGHTIME CONDITIONS

As previously described in reference to FIG. 1, the novel system can also be used in a nighttime scenario which will now be described in reference to FIGS. 22–34.

Figure 22:
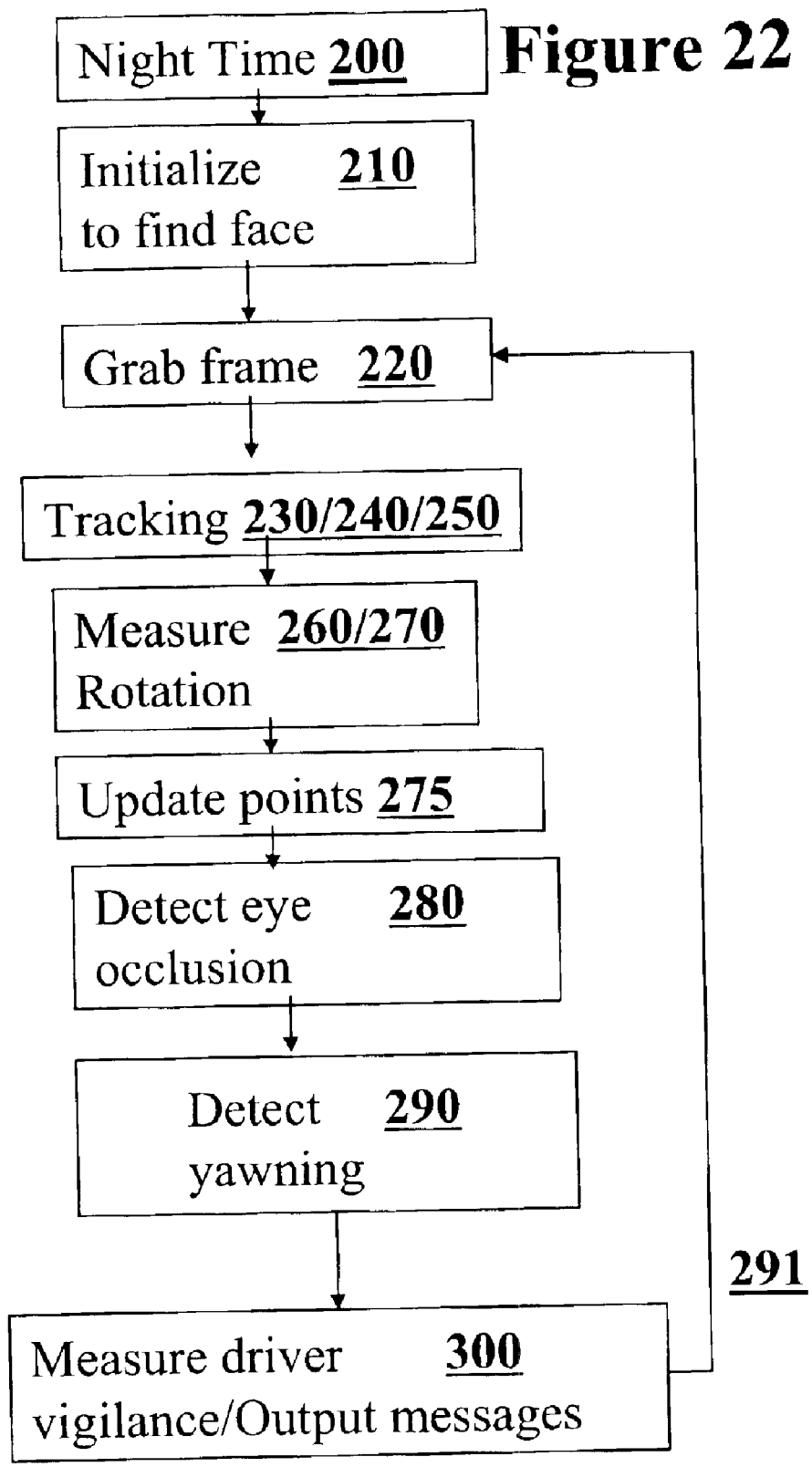
FIG. 22 is a detailed flowchart for the night time tree portion of the flow chart of FIG. 1.

Referring to FIG. 22, is a detailed overview flowchart of the nighttime scenario operation of the invention. If it is nighttime perform the following steps: To determine if it is night any of the three conditions can occurr. If a camera clock is between 18:00 and 07:00 hours and/or if the driver has his night time driving headlights on or if the intensity of the image, is below a threshold it must be dark, so use the night time algorithm steps.

Under nighttime conditions, step 210, initialization is performed to find the face feature points. The frame is taken from the video stream in 220. Tracking is done in stages. There are multiple stages in the eye tracker. Stage 1, 230, and Stage 2, 240, operate independently. Lip tracking is done in 250. A bounding box around the face is constructed, 260, and then the facial orientation is computed 270. The feature points are updated if necessary, 275. Eye occlusion is determined in 280. Yawning is detected in 290. The rotation, eye occlusion, and yawing information is fused (combined together) in 300, to determine the vigilance level of the operator. This is repeated by, 291 for additional frames. Finally, measuring driver vigilance/output messages 300 is determined.

The initialization step 210 will now be described.

Figure 23:
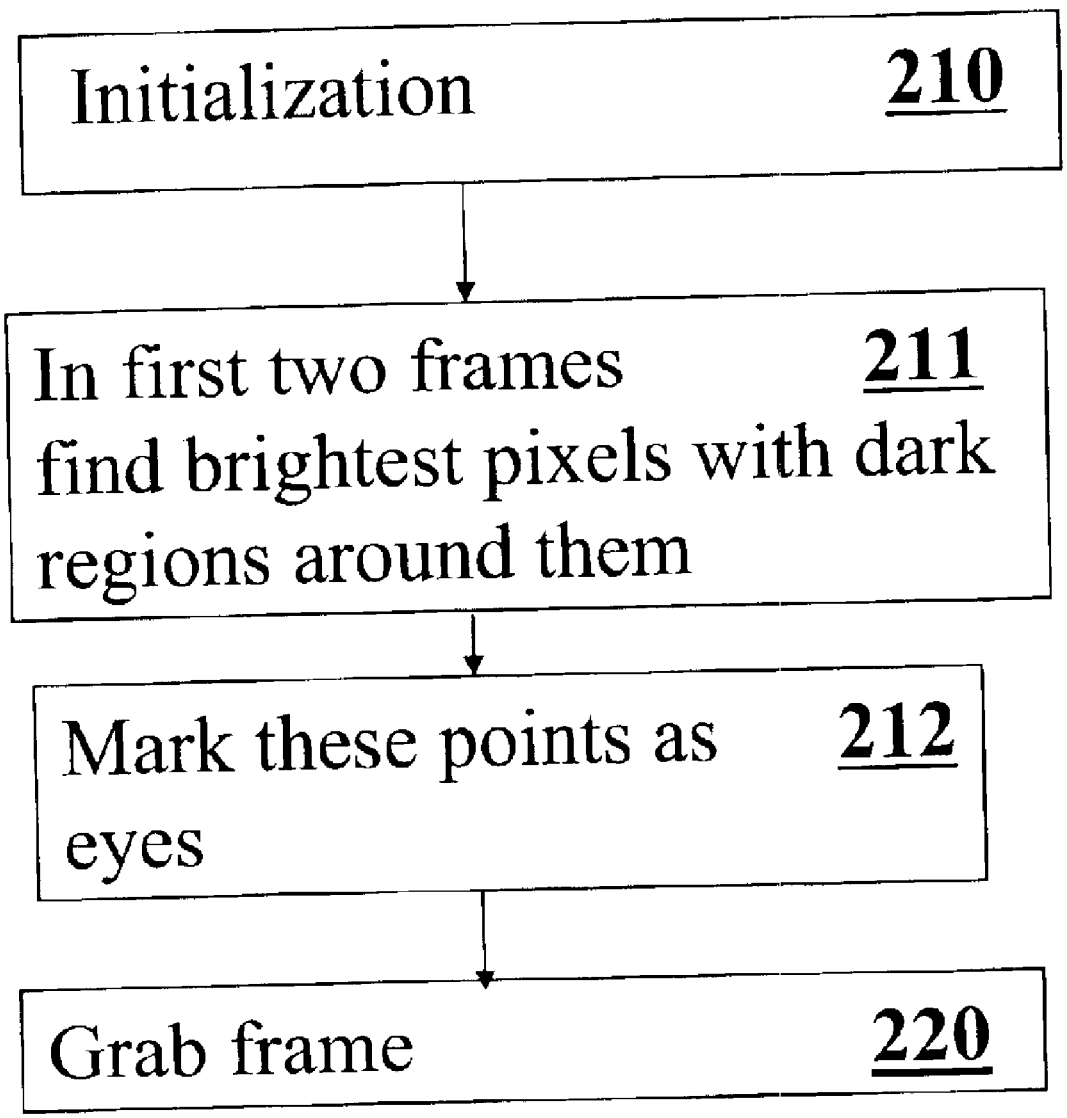
FIG. 23 is a flow chart illustrating the initialization steps for FIGS. 1 and 22.

Referring to FIG. 23, the invention initialize eyes by finding the bright spots with dark around them, 211. In the first two frames the system finds the brightest pixels with dark regions around them. These points are marked as the eye centers, 212. In subsequent frames there brightest regions are referred to as the eye bright tracker estimate. If these estimates are too far from the previous values, retain the old values as the new eye location estimates. The next frame is then grabbed at step 220.

Figure 24:
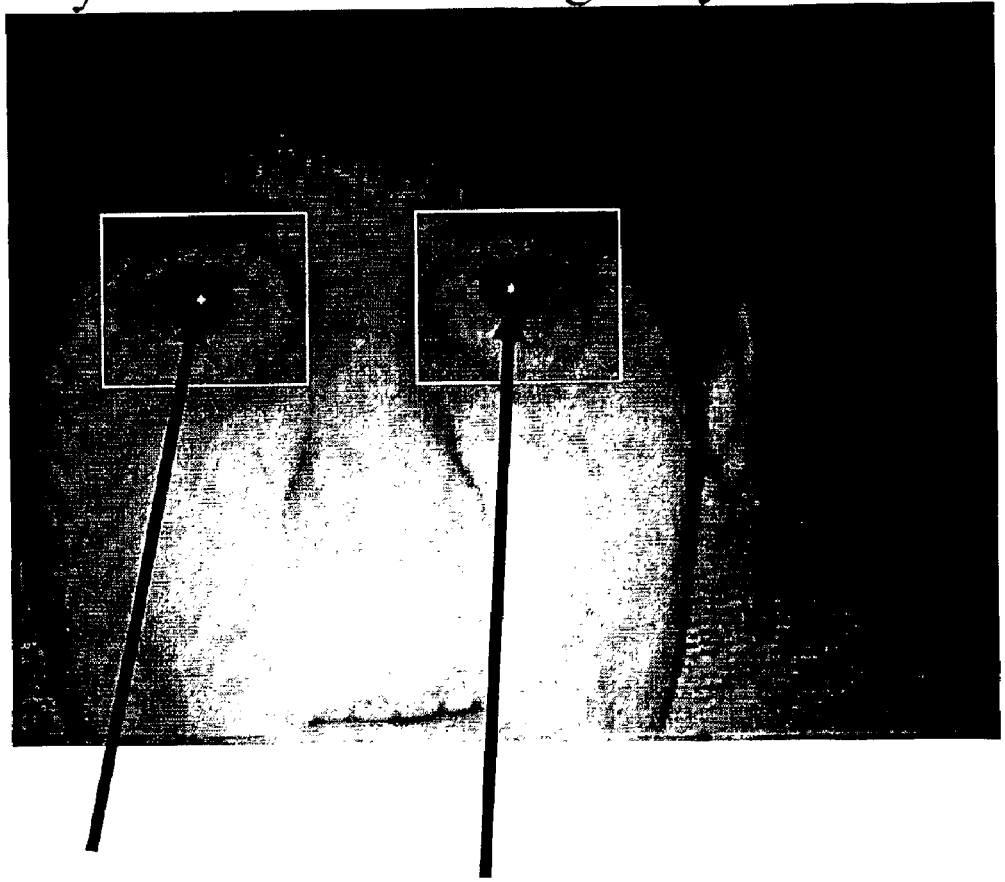
FIG. 24 are visual images illustrating initialization of FIG. 22.

FIG. 24 illustrates the visual images of the results of nighttime initialization of FIG. 23. These images show that the presented method is able to take night input images of faces and automatically determine where the eyes are. When looking at the images one can see that the eye initialization method described here works.

The multistage eye tracker 230/240 of FIGS. 1 and 22 will now be described in reference to FIG. 25.

Figure 25:
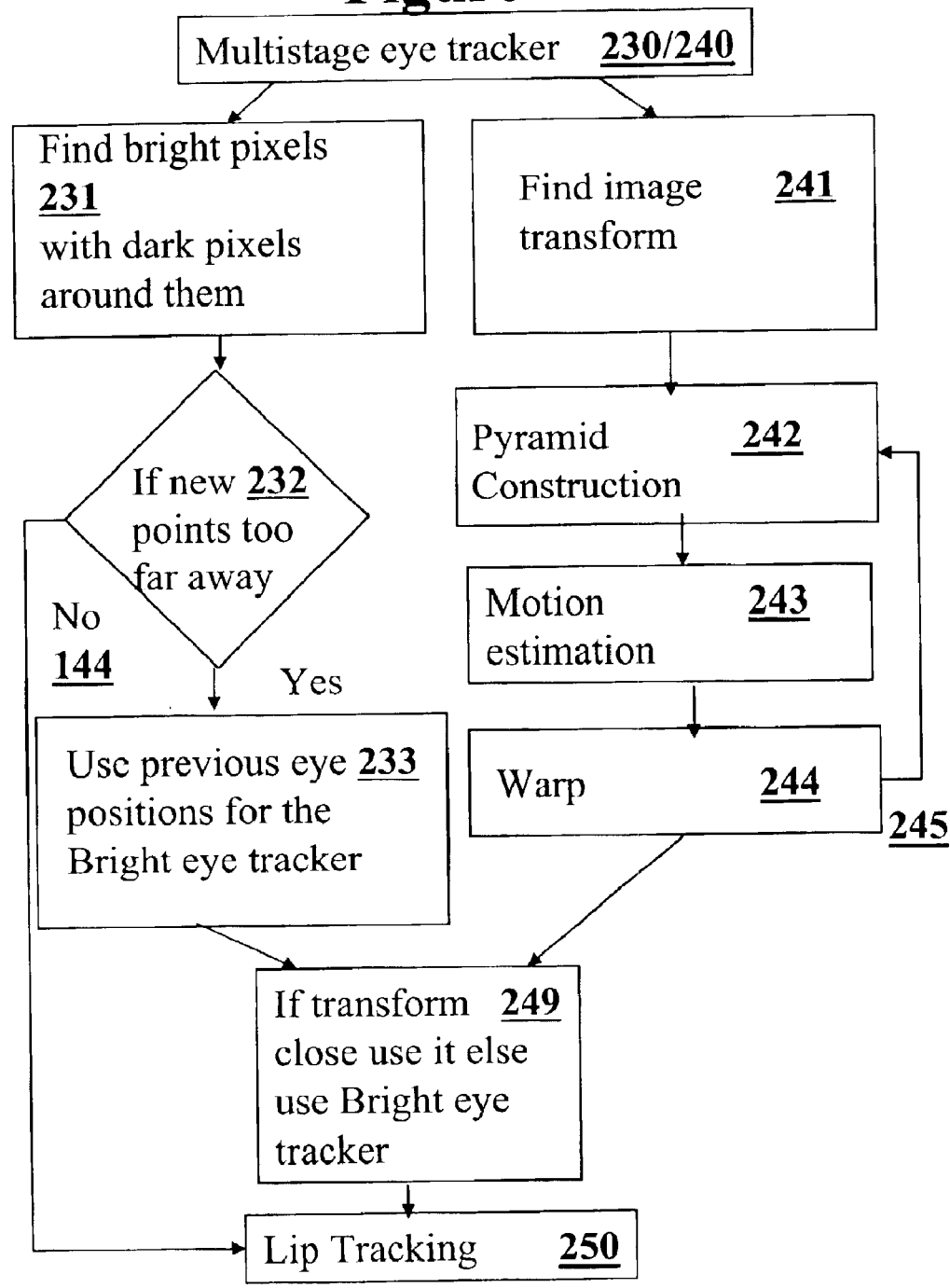
FIG. 25 is a flow chart of the eye tracking steps for FIGS. 1 and 22.

Referring to FIG. 25 the system runs two independent subsystems, 230 and 240. Starting with the left subsystem 230, first the dark pixel is located, 231 and tested to see if it is close enough to the previous eye location, 232. If these estimates are too far from the previous values, the system retains the old values as the new eye location estimates. If the new estimates are close to the previous values, then these new estimates are kept.

Referring to FIG. 25, the second subsystem, finds the image transform, 241. This stage tries to find a common function between two images in which the camera moved some amount. This function would transform all the pixels in one image to the corresponding point in another image. This function is called an affine function. It has six parameters, and it is a motion estimation equation. Finding this function, requires following the below steps. In the first step is pyramid construction, 242. Use a 1 dimensional (1-D) mask initialized to mask[0 ]=0.25–.04/2.0; mask [4]=0.25–0.4/2.0; mask[1]=0.25; mask[3]=0.25; mask[2]=0.4. Once the mask is initialized each mask location is multiplied with a corresponding image pixel around the current pixel. See equation (6) previously described for details. Note other numbers can also be used. This function is applied to 5 pixels in the row, with i going from −2 to 2. Mask location mask[2], or i=0, is the midpoint. First do the mask application vertically. The 1-D mask is applied to alternate columns of the image. This results in an image with the same width but half the height, call it imageA. Apply the 1-D mask to alternate pixels along each row of imageA, which results in an image that was half the width and half the height as the previous(original) image(before construction of imageA). ImageA is called a pyramid. Repeat the above process approximately three times, resulting in a stack of images, each reduced in size by half in each dimension. This stack of images is referred to as pyramids.

Motion estimation is then performed at step 243. Here assume global motion and use the affine functions u(x,y)= a*x+b*y+c and v(x,y)=d*x+e*y+f. See equations (7)–(8) previously described which is incorporated herein. The invention minimizes this motion estimation function over the whole image at the highest level of the pyramid. The invention can construct an error function as follows. U(X)= <u(x,y) v(x,y)>=X(x)a, where X=a2×6 matrix= |x y 1000| |000x y1| and a=[a b c d e f]$^T$ $$Error(del(a)) = \sum_x (f_i + f_x^T \delta U)^2,$$

is based on the function $f_x u + f_y v = -f_1$.

These equations were described in detail in reference to equations (9)–(10) previously described which are incorporated herein.

Referring to FIG. 25, the warping step occurs next 244. Image warping, here uses bilinear interpolation to get the four points which are closest to (x,y). The invention uses error measures to get the pixel at time t based on an average of the four closest values, from time t−1. This process is repeated to improve the transform, 245, using a method called Coarse to fine refinement: we integrate these new motion parameters into the current motion parameters, to get a better estimate of the motion.

Steps 242–244 in FIG. 25 are repeated as can be seen with the loop back at 245. The loop is taken three times, though another number of iterations could be used. The motion parameters are then sent to the next lower level of the pyramid, updating the motion parameters for this level with the higher level motion parameters. When done with all iterations at all levels, these values are the affine parameters. To get the new eye location we use these motion parameters and warp the previous eye center with the inverse of these parameters and see where the new eye center is. For the eye tracking purposes the invention uses subimages and not whole images. The subimage to use is a window around each eye in the current image. The invention goes to the next image, and creates a subimage with the same position, respectively for each eye. The necessary parameters are computed for each eye from the current to the next subimage. Each eye has its own function, which is used to estimate the location of the eye in the next frame.

The results of each subsystem(231–233 and 241–244) are fused(combined) together, 249, in the following manner. Provided there is a previous frame, the invention computes the affine function between the eye subimage as described above. For the eye points the system uses the previous affine function value eye points if available. If they are too far from the previous image eye points in the vertical direction, the system marks the affine function values as unstable. It will stabilize when approximately two of the three brightest points in the image correspond to the eye bright tracker estimates. When it is stabilized, the system uses the eye bright tracker estimates to reinitialize. Provided the affine function eye estimates are valid use these values for the true eye values. Then lip tracking is performed next at 250(see FIGS. 22 and 27).

Figure 26:
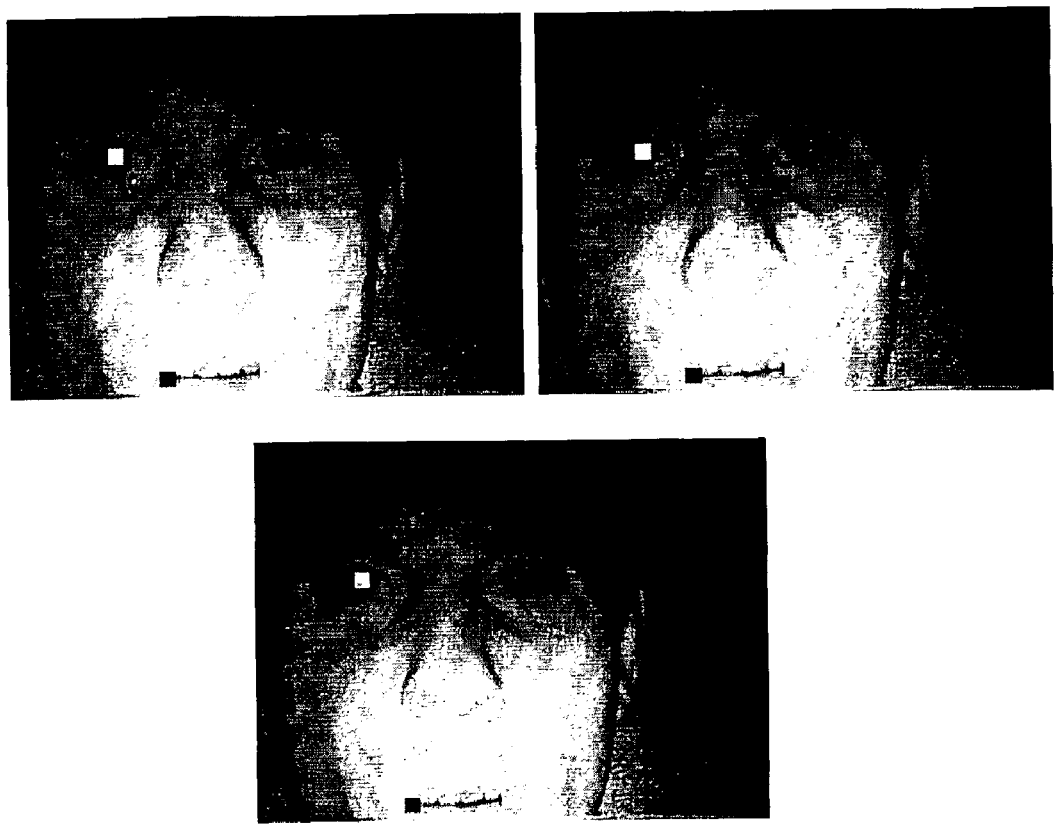
FIG. 26 are visual images illustrating eye tracking of FIG. 25.

FIG. 26 illustrates the visual images of the results of eye/head tracker

Figure 27:
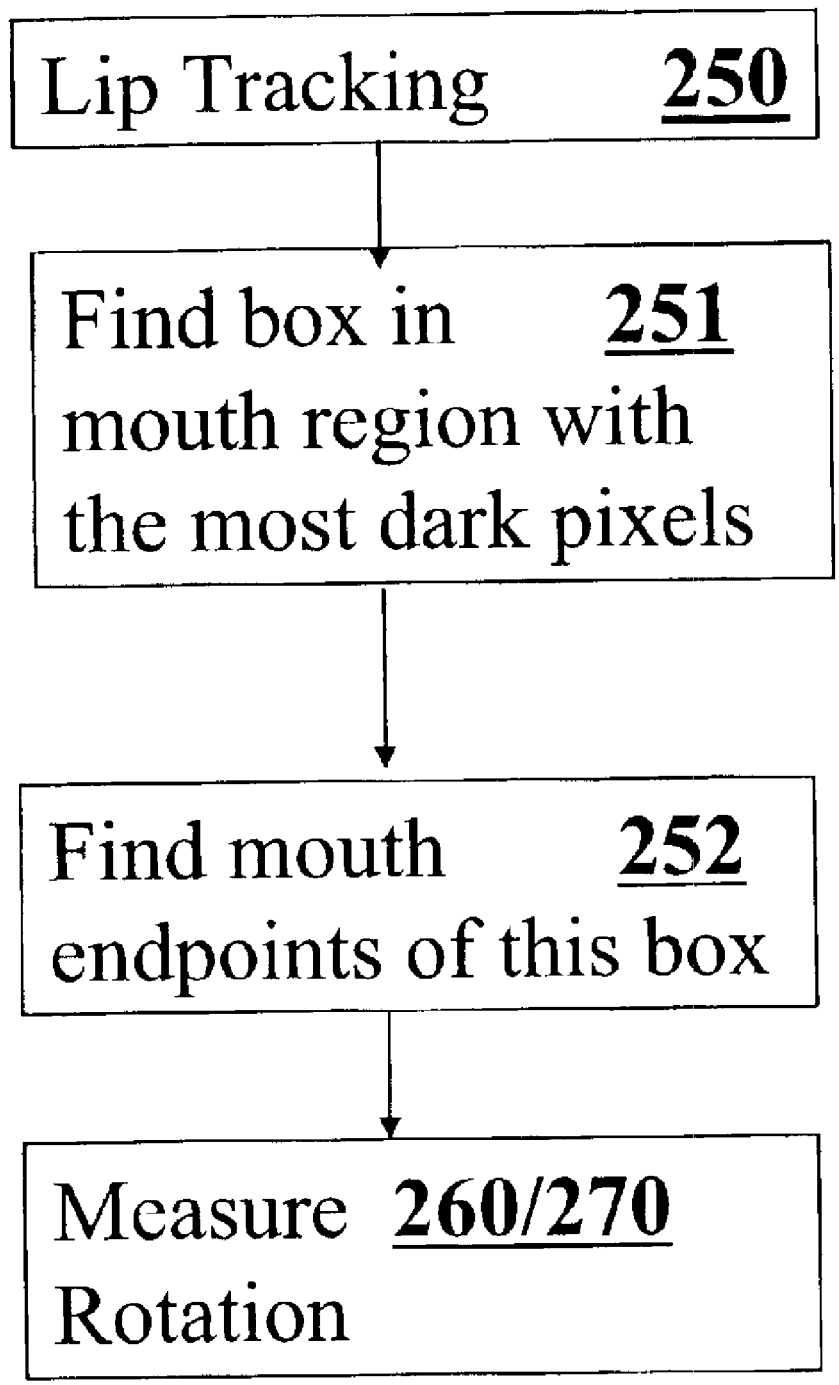
FIG. 27 is a flow chart of the lip tracker steps of FIGS. 1, 22, and 25.

Referring to FIG. 27, the system will find the box with the maximum number of dark pixels in the region, 251. When the anandan transform has re-stabilized, the box search starts at approximately 80 pixels below the eyes for the current frame. Provided the affine function eye estimates are valid, then search for the mouth starting approximately 30 pixels above the previous average mouth position. The system selects as the mouth region the box with the most dark pixels. The endpoints are marked as the mouth corners, 252. When more than approximately five columns have not had any dark pixels than assume that the end of the mouth is reached. If either side of the mouth was not found, the system sets it approximately 40 pixels away (in the appropriate direction) from the known side. If neither side was found, in the next frame the system starts the box search starting at approximately 80 pixels below the eyes. Rotation is measured next, 260–270 as shown in FIGS. 22 and 29.

Figure 28:
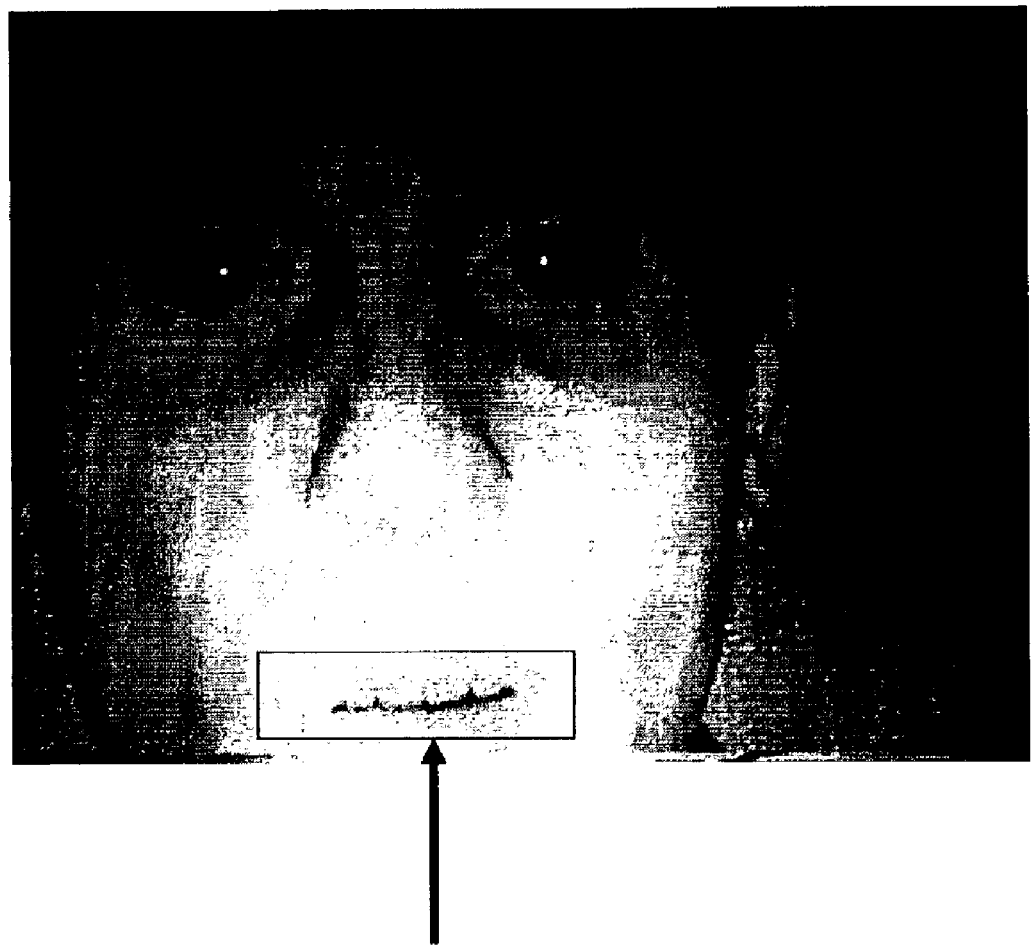
FIG. 28 are visual images illustrating results of whole head tracker steps of the preceeding figures.

FIG. 28 illustrates the visual images of the results lip/head tracking. These images show that the presented method is able to take night input images of faces and robustly and automatically track the eyes and lips. When looking at the images one can see that the tracking method described here works.

Figure 29:
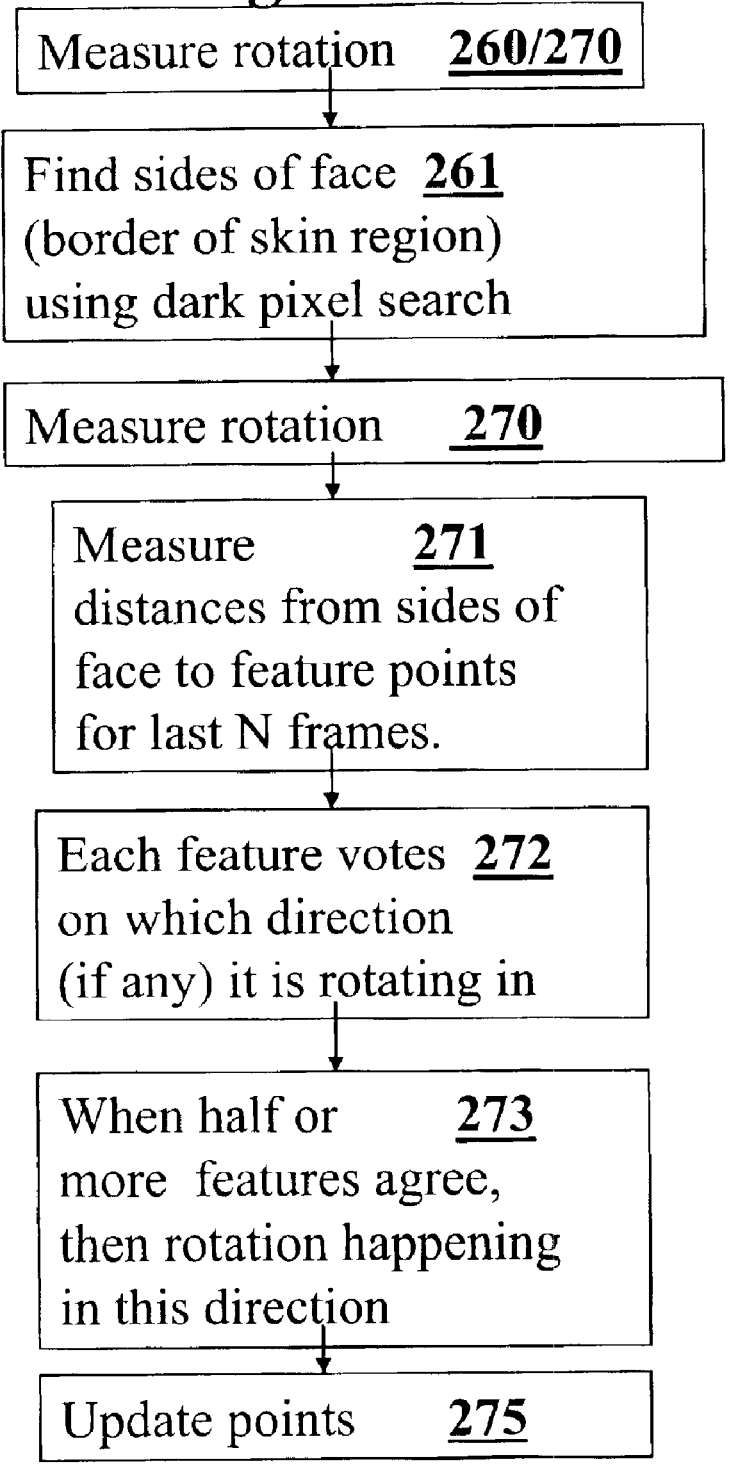
FIG. 29 is a flow chart of the measure rotation steps of FIGS. 1 and 27.

Referring to FIG. 29, the system finds the sides of face, 261 (the border of the skin region using a dark pixel search). The system starts searching approximately thirty pixels above each eye position and searches outward in both directions until approximately 10 consecutive dark pixels are found. The system marks this point as the respective side of the face. If approximately 10 consecutive pixels are not found, the system marks the side of the image as the edge of face.

To measure rotation, 270, the distance from sides of face to feature points are measured, 271. The system can take the derivative of these measurements over time. And consider (store) only the direction of the derivative. Voting happens next, 272. A feature indicates rotation in the respective direction based on whether the direction of the derivative is positive or negative. A direction of zero indicates no rotation in either direction. When more than half of the distances of a particular feature indicate rotation in some direction, this feature is assumed to be involved in head rotation. Each feature independently determines if it is involved in rotation. Further each feature has two degrees of freedom(horizontal and vertical). When half (out of four) or more features indicate rotation in a particular direction the system declares rotation is happening in this direction. The system then decides if rotation is happening, 273, based on the voting information. Update features occurs next, 275 as depicted in FIGS. 22 and 31.

Figure 30:
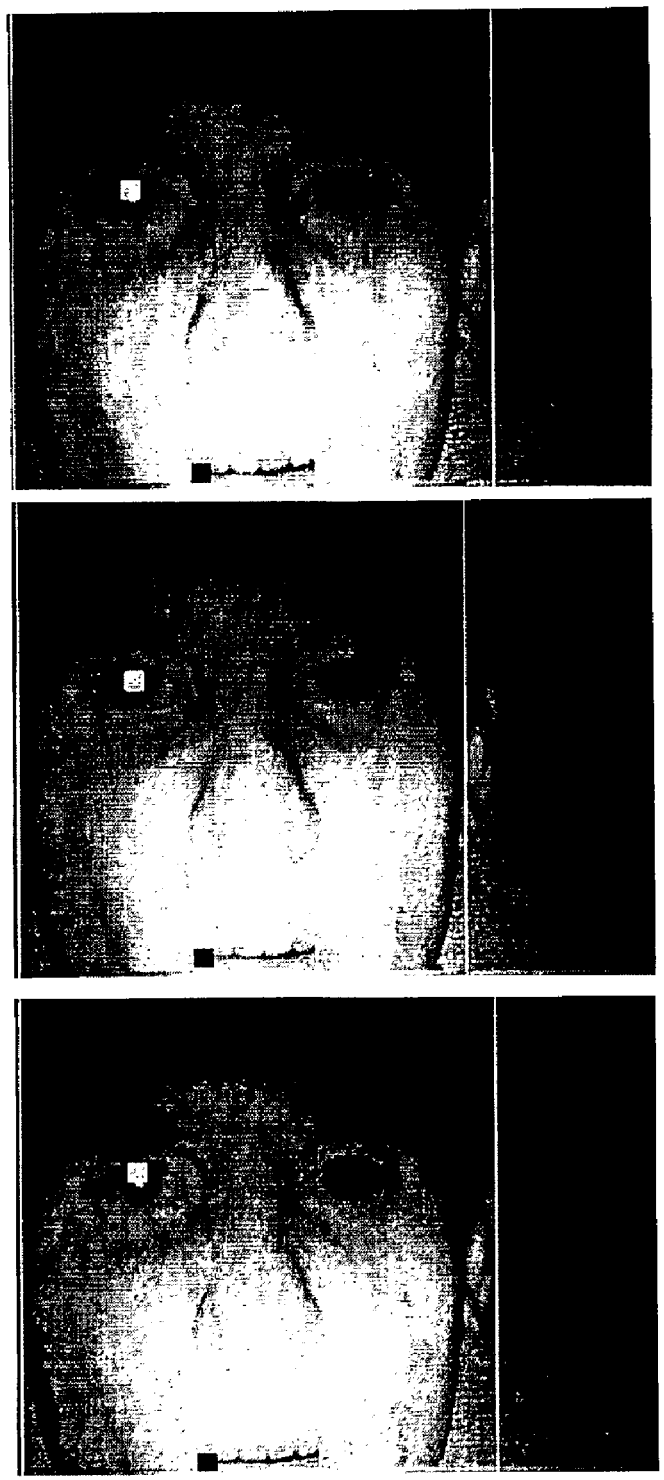
FIG. 30 are visual images illustrating detection of bounding box of FIG. 29.

FIG. 30 illustrates the visual images of the results of bounding box/rotation.

Figure 31:
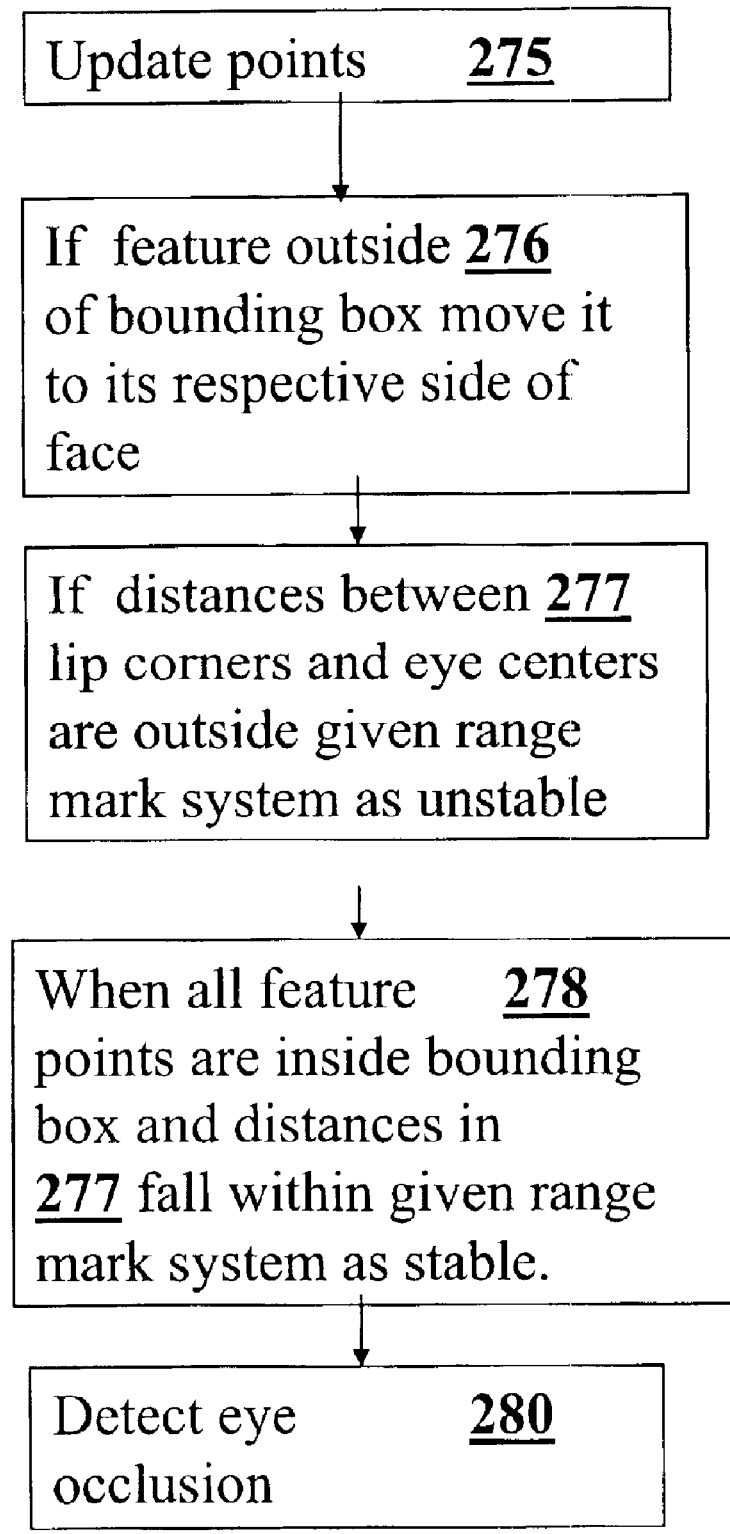
FIG. 31 is a flow chart of the update points steps of FIGS. 1, 22 and 29.

Referring to FIG. 31, feature points are updated, 275. The feature points are moved inside the bounding box, if necessary, 276, in the following way. If any of the eye points or mouth edges are outside of the sides of the face the system moves these points to their respective sides of the face. The system looks at the distance between the lip points. If they fall within a range depending on the size of image, and if the distance between the eyes fall within a range depending on the size of the image, the system is marked as unstable. This indicates that occlusion of features (for instance by rotation) is happening. The system is marked as unstable until all feature points are within the bounds of the face and until the distances between the eye points and mouth points has stabilized, 277. When all features are in bounding box, and distances fall within given range, the system marks as stable, 278. Next detect eye occlusion, step 280, occurs as depicted in FIGS. 22 and 32.

Figure 32:
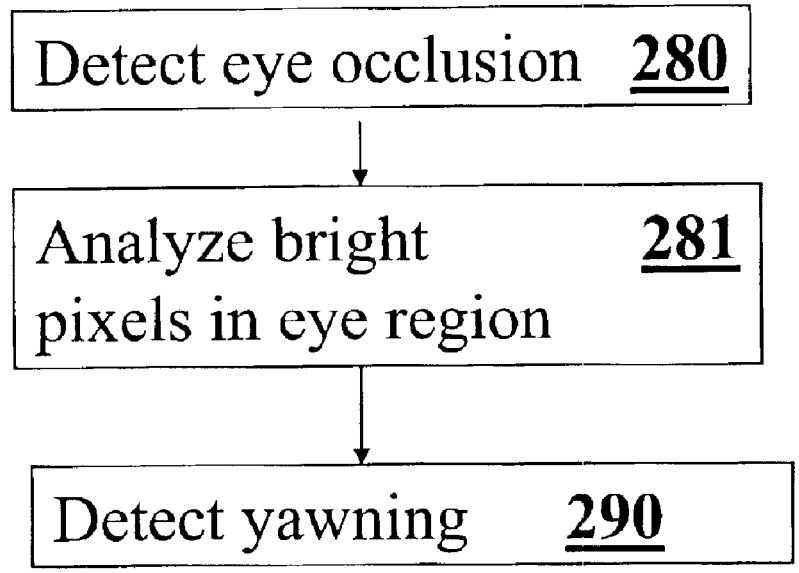
FIG. 32 is a flow chart of the detect eye occlusion steps of FIGS. 1, 22 and 31.

Referring to FIG. 32 bright regions are analyzed, 281. As long as there are eye-white pixels in the eye region the eyes are considered open. If not, then blinking is happening. To determine what eye-white color is, in the first frame of each sequence the system finds the brightest pixel in the eye region and uses this as the eye white color.

When the number of skin pixels in the eye region increases to approximately more than $4/5$ of the size of the eye region rotational eye occlusion is happening. Next the yawning step 290 occurs as depicted in FIGS. 22 and 33.

Figure 33:
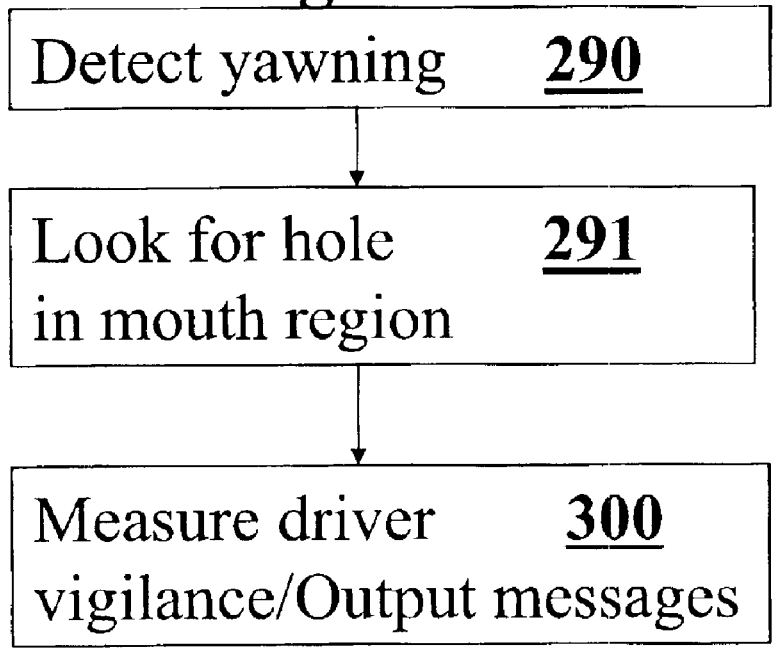
FIG. 33 is a flow chart of the detect yawning steps of FIGS. 1, 22 and 32.

Referring to FIG. 33, the system looks for a hole in the mouth region, 291 to detect yawning, and goes to a point in between the two mouth corners. The system looks on a vertical line approximately 10 pixels below and approximately 30 pixels above the midpoint. If there are on this vertical line, more than approximately 25 non-skin pixels, the mouth has opened, which is a yawn. Then driver vigilance is determined, 300.

FIG. 34 illustrates visual images of the results of eye occlusion, yawning. These images show that the presented method is able to take night input images of faces and robustly and automatically determine when eye occlusion and yawning occur. When looking at the images one can see that the method described here works.

The nighttime scenario now uses the steps 300–399 described in FIGS. 14–21. The measuring of driver vigilance 300(FIGS. 14–21) will now be described.

Referring to FIG. 14, driver vigilance is measured. Although a preferred example is given below, similar other techniques can also be used for determining similar results. First excessive up/down head motion is detected, 310. Excessive left/right head motion is detected next, 330. Excessive eye closure(eye occlusion) is detected, 350. Excessive yawning is detected, 370. The above data is then fused to determine appropriate output messages, 390. A more detailed description of the steps in FIG. 14 will be described in reference to FIGS. 15–21.

Referring to FIG. 15, rotation information from previous frames is stored, 311(store rotation information for the last approximately 20 frames as was previously described in steps 260/270). Next the system determines if excessive up/down head motion is occurring, 312. If rotation in a single direction occurs for more than approximately 10 out of the last approximately 20 frames the system warns that the driver is not paying adequate attention to the road. Excessive left/right head motion is detected next at step 330(FIGS. 14 and 16).

Referring to FIG. 16, rotation information for previous frames is stored, 331 (rotation information is stored for the last approximately 20 frames as previously described in reference to steps 260/270). Next the system determines if excessive left/right head motion is occurring, 332. If rotation in a single direction occurs for more than approximately 10 out of the last approximately 20 frames the system warns that the driver is not paying adequate attention to the road. Excessive eye closure(occlusion) step 350 is detected next (350 FIGS. 14 and 18).

FIG. 17 illustrates the visual images of the results of excessive left/right/up/down head motion detection from FIGS. 15–16. These images show that the presented method is able to take input images of faces and automatically determine when excessive rotation occurs. When looking at the images one can see that the excessive rotation detection method described here works.

Referring to FIG. 18, eye blink(occlusion) information 350 for previous frames is stored, 351. Here the system stores eye blink(occlusion) information for the last approximately 60 frames as previously described in steps 280–281. Next the system determines if eye closure(occlusion) is occurring, 352. If the eyes have been closed for more than approximately 40 of the last approximately 60 frames, the system declares that driver has his eyes closed for too long. Excessive yawning is detected next(step 370 FIGS. 14 and 20).

FIG. 19 illustrates the visual images of the results of excessive eye closure detection of FIG. 18. These images show that the presented method is able to take input images of faces and automatically determine when excessive eye closure occurs. When looking at the images one can see that the excessive eye closure detection method described here works.

Referring to FIG. 20, excessive yawning step 370 is detected in 371. If there are approximately three distinct yawns in a 30 second time period, the system can immediately warn that the driver is drowsy. The system determines if it is necessary to output any warnings at step 390/399 which will be described later in greater detail in reference in FIG. 35.

FIG. 21 illustrates the visual images of the results yawning detection of FIG. 20. These images show that the presented method is able to take input images of faces and automatically determine when excessive yawning occurs. When looking at the images one can see that the excessive yawning detection method described here works.

OUTPUT

The output signals 399 of FIGS. 1, 2 and 22 will now be described in reference to FIG. 35.

Figure 35:
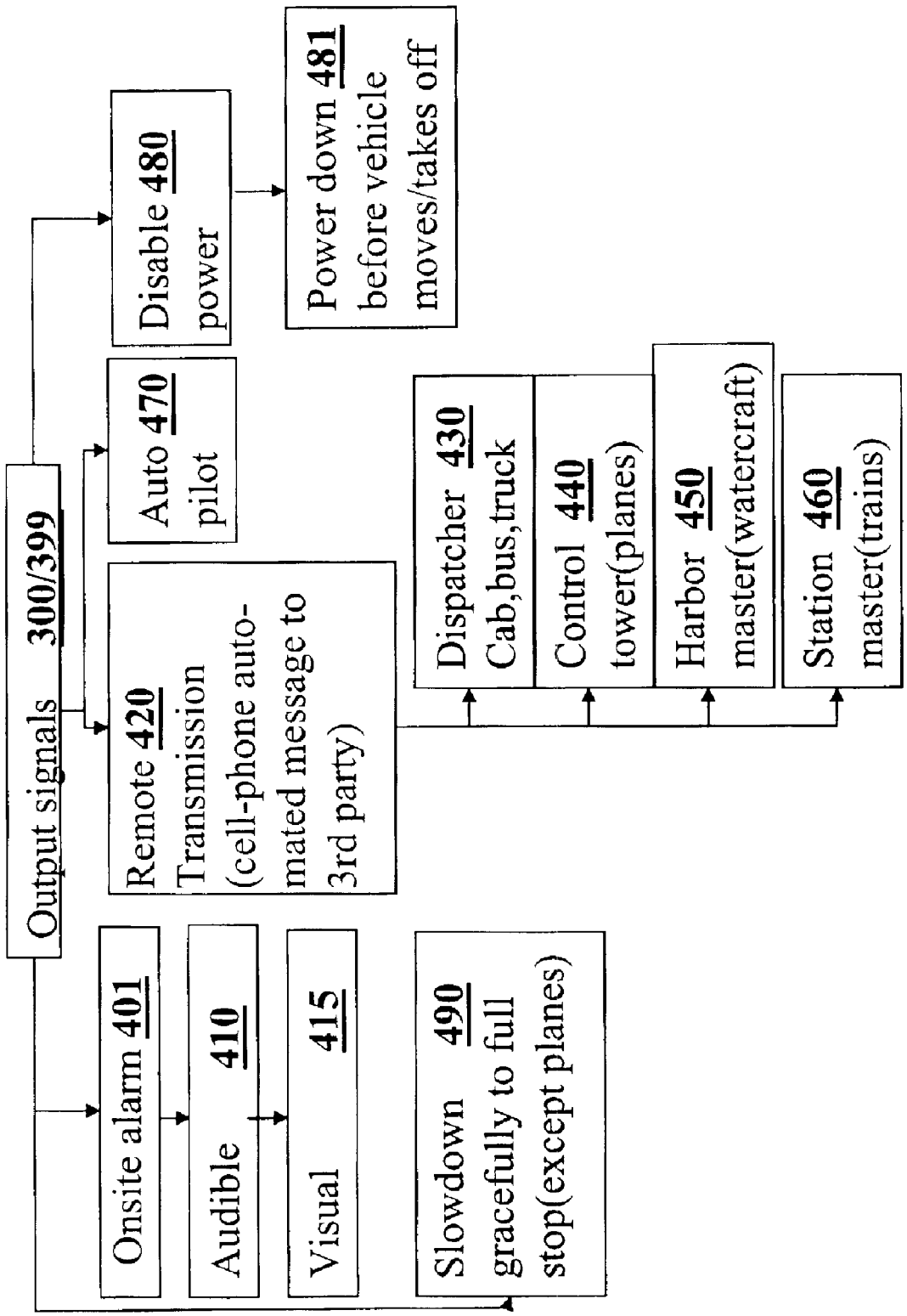
FIG. 35 is a flow chart of various output signals from FIGS. 1, 2 and 22.

Referring to FIG. 35, the invention can be configured to output signals and/or output messages to various sources, 399. Onsite alarms within the vehicle, 401 can be audio, 410 and/or visual, 415.

Remote alarms, 420, can be sent to the various authority agencies, 430–460. For example, an automated cell phone message can be sent to a third party such as a dispatcher 430 that controls cabs, trucks, and busses.

The invention can be used in cabins on airplanes so that a remote transmission can be sent to a control tower 440.

The invention can be used with water craft such as boats, where the remote transmission can be sent to a harbor master 450.

Still furthermore, the invention can be used on trains and subways, where the remote transmission can be sent to a station master 460.

The invention can be used with auto-pilot mode systems that can be invoked in 470 to take the controls away from the driver, pilot, etc.

For all applications except for a plane the system can be used to slow down the moving vehicle, train, boat gracefully to a full stop.

For all applications of a vehicle, a plane, a train or watercraft, the invention can be used to power down(480) before the vehicle or train or water craft moves or before the plane takes off, 481. Slowdown gracefully to full stop is available except for aircraft, 490.

Figure 36:
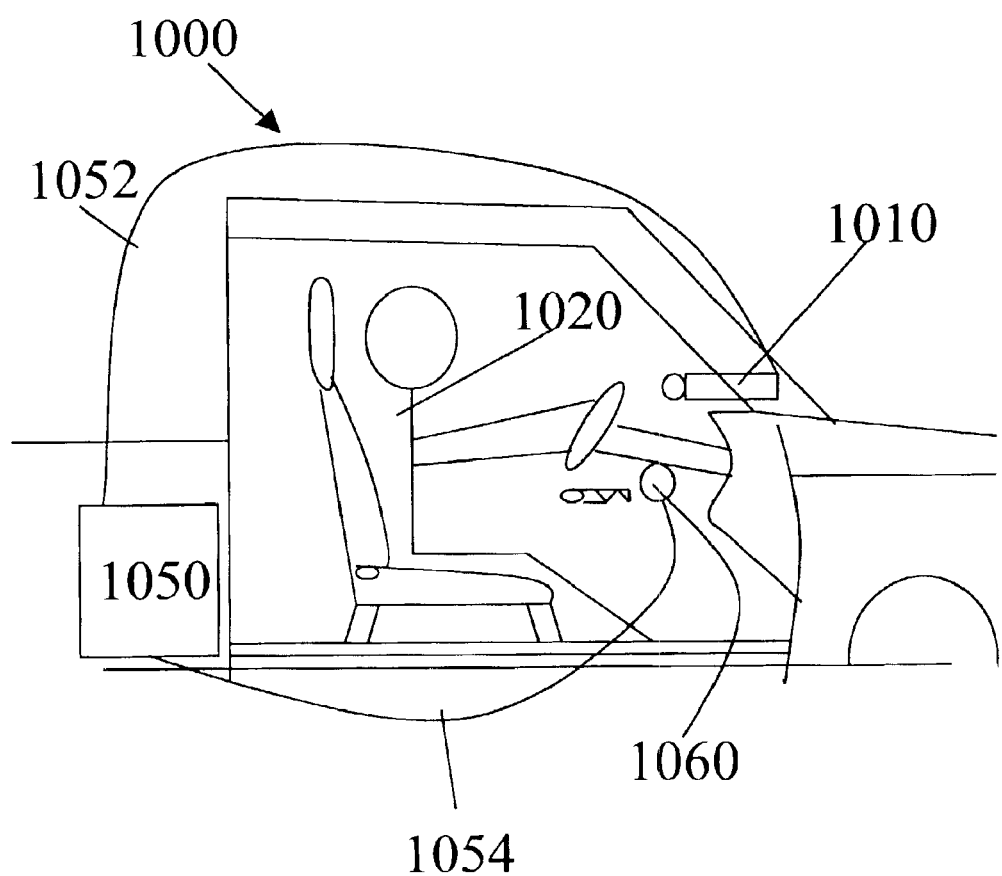
FIG. 36 illustrates an application of the novel invention for the driver of a vehicle.

FIG. 36 shows an application of the invention for a vehicle such as but not limited to a truck, a bus, a cab, and the like. A personal computer 1050 can be located in the rear of the car. It has two connections. One connection 1052 can go to a digital camera 1010 located and mounted on the dashboard. Below the steering wheel is the ignition 1060. The second connection 1054 connects the computer 1050 to the ignition 1060. This allows the system to be activated when the car is started. The alerting system can include parts depicted in FIG. 35. A cell phone or any other type of remote sending transponder/transmitter can be encased in the PC unit 1050 to allow for notification of various authorities(cab company etc . . . ) of the potential hazardous operating of the vehicle 1000. An onboard alarm can also be encased in the PC unit 1050 can be either or both an audio/visual alarm. Also the police/fire/rescue can be notified via the onboard cell phone 1050 as needed.

Figure 37:
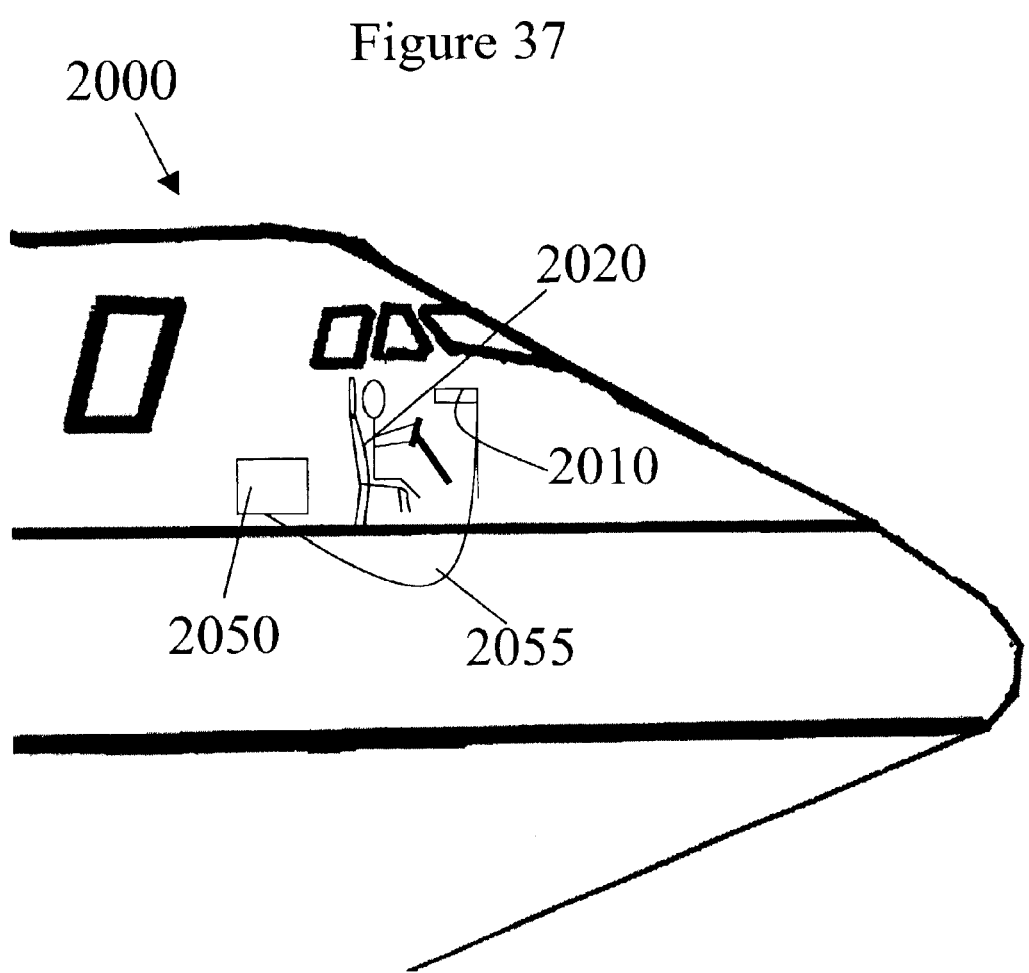
FIG. 37 illustrates an application of the novel invention for pilot of a plane.

FIG. 37 shows an airplane 2000 using the novel invention. The personal computer 2050 can be located in the cockpit and have a connection 2055 that goes to a digital camera 2010 located in front of the pilot(s) 2020. The digital camera 2020 can be mounted near the airplane controls. The alerting system can include parts depicted in FIG. 35. For example, a cell phone/transmitter, and the like can be encased in the PC unit 2050 to allow for immediate notification of various authorities(Control tower . . . ) of the potential hazardous operation of the aircraft. An onboard alarm can also be encased with the PC unit 2050 and can be either or both an audio/visual alarm. Also the police/fire/rescue can be notified via the onboard cell phone/transmitter as needed.

Figure 38:
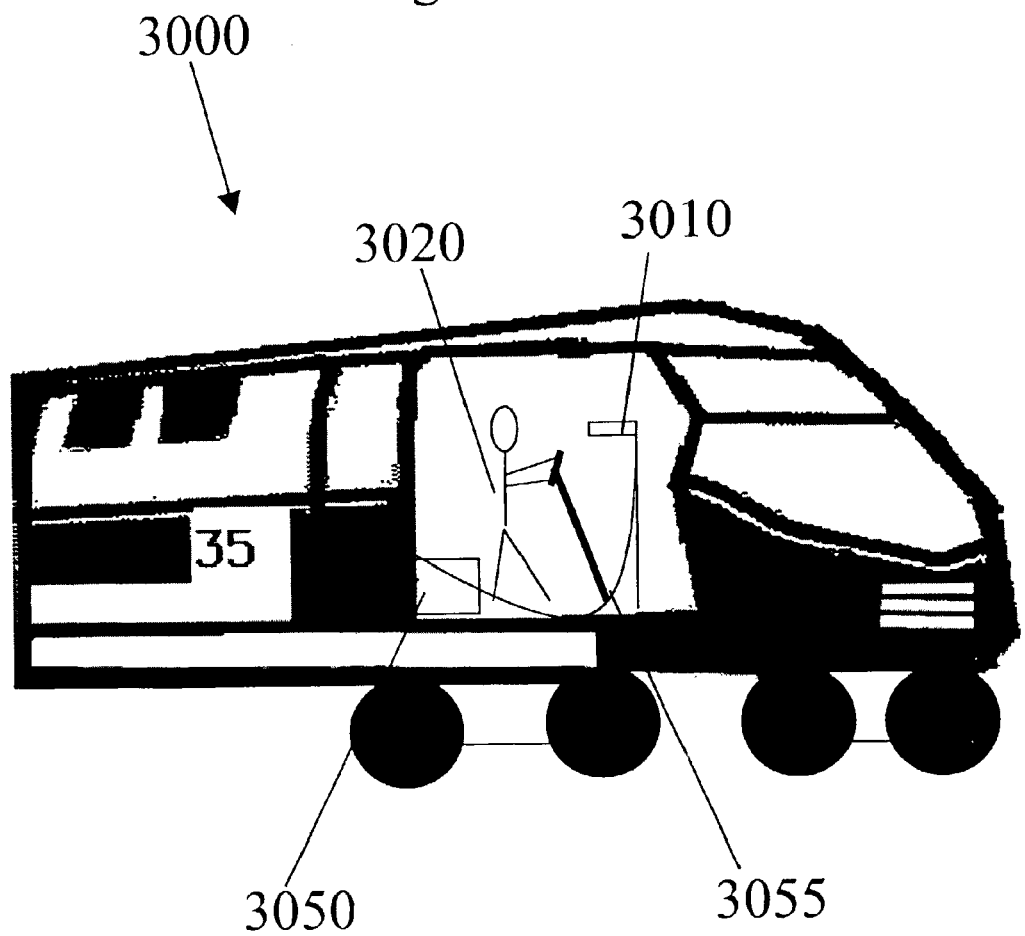
FIG. 38 illustrates an application of the novel invention for a train engineer.

FIG. 38 shows a train/subway type engine 3000 using the novel invention. A personal computer 3050 can be located in the locomotive and have a connection 3055 that goes to a digital camera 3010 located in front of the engineer 3020. The digital camera 3010 can be mounted near the locomotive controls. The alerting system can include components described in reference to FIG. 35. A cell phone/transmitter and the like can be encased in the PC unit 3050 to allow for notification of various authorities(Station master . . . ) of the potential hazardous operation of the locomotive. The onboard alarm can be either or both an audio/visual alarm. Also the police/fire/rescue can be notified via the onboard cell phone/transmitter as needed.

Figure 39:
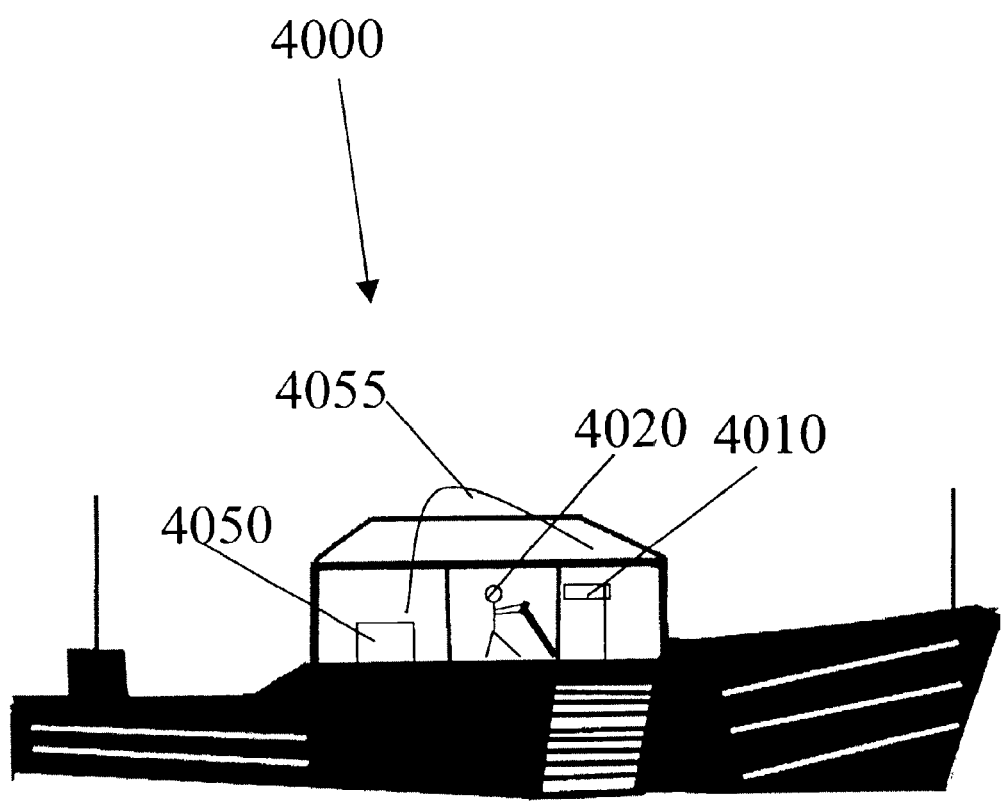
FIG. 39 illustrates an application of the novel invention for a boat captain.

FIG. 39 shows a watercraft application 4000 of the novel invention. A personal computer 4050 can be located in the watercraft and have a connection 4055 that goes to a digital camera 4010 located in front of the captain/skipper 4020. The digital camera 4010 can be mounted near the watercraft controls. The alerting system can include components depicted in FIG. 35. A cell phone/transmitter, and the like can be encased in the PC unit 4050 to allow for notification of various authorities(Harbor master . . . ) of the potential hazardous operation of the watercraft. An onboard alarm that can be either or both an audio/visual alarm can also be used. Also the coast guard/navy/rescue can be notified via the onboard cell phone/transmitter as needed.

The novel methods and system allows for the unique simultaneous detection of head rotation conditions, eye closure conditions and yawning conditions of a single driver by a single camera.

For head rotation monitoring conditions, the novel methods and systems allow for monitoring driver vigilance and activating alarm outputs when head rotation conditions (nodding, up/down, and/or left/right head movements) exceeds a selected threshold value. For example, selecting a frequency of greater than 2 nods within a 2 seconds, or prolonged gazing in a nonforward gazing direction can set off an alarm condition output as previously described.

For yawning monitoring conditions, the novel methods and systems allow for monitoring driver vigilance and activating alarm outputs when a frequency rate of yawning exceeds a selected threshold value and/or when prolonged yawning occurs. For example, as previously described selecting a threshold of detecting 3 distinct yawns within 30 seconds can set off an alarm condition output as previously described condition(estimated when the camera is taking picture frames at approximately 30 frames per second).

For eye closure(s)(blinking) monitoring conditions, the novel methods and systems allow for monitoring driver vigilance and activating alarm outputs when blinking frequencies and/or length of time of an eye closure exceeds selected threshold values. For example, as previously described within a 2 second interval detecting blinking in approximately 40 out of approximately 60 frames can set off an alarm condition(estimated when the camera is taking picture frames at approximately 30 frames per second).

The novel methods and systems allows for customizing the settings of different threshold levels for each of the monitored conditions(head rotation, yawning and eye closure(s).

While the system has been described as being primarily used for determining driver fatigue and lack of sleep, the invention can be additionally to detect alertness and vigilance problems of drivers that have been affected by prescription drugs, illegal drugs, alcohol consumption, and the like.

Alcohol and both prescription, legal and illegal drugs can also affect driver vigilance. For example, some of the physical manifestations exhibited by drivers affected by alcohol and drugs also include head rotation such as nodding off with the head and prolonged eye closures, yawning and blinking. The subject invention would provide a superior visual monitoring method and system for detecting these problems. In addition, pilots, boat captains and train engineers that are affected by alcohol and both legal and illegal drugs, would also benefit from the subject novel methods and systems for monitoring driver vigilance.

Although the preferred embodiments primarily describe applications of the invention to commercial type drivers (trucks, busses, etc.), the invention can be used with personal vehicles such as automobiles, and the like. Furthermore, the system can be used with or as a substitute for court required systems such as vehicle breathalyzers, and the like.

Figure 40:
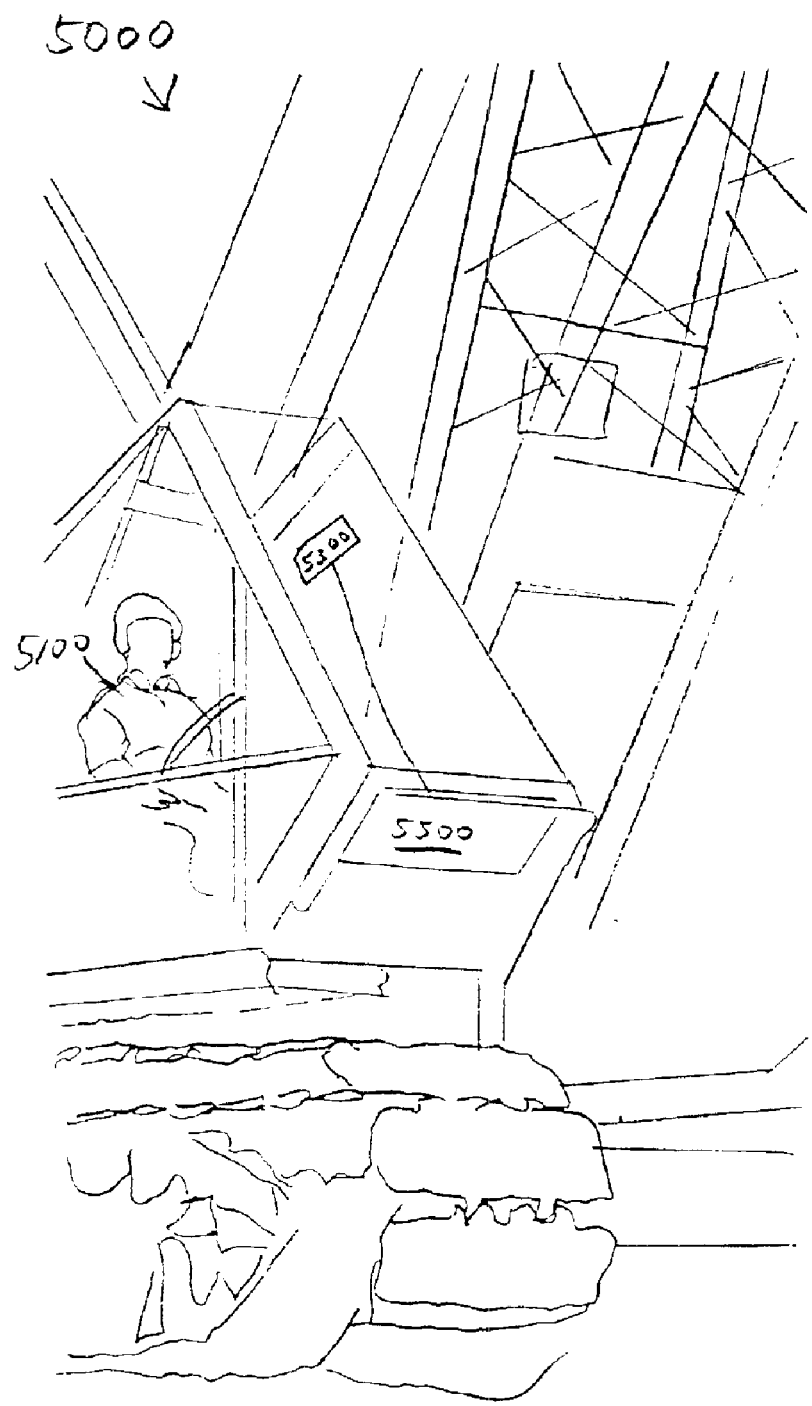
FIG. 40 illustrates an application of the novel invention with an operator of stationary equipment.

Still furthermore, the invention can monitor operators of equipment such as operators of stationary heavy equipment, operators of cranes, tractors, and the like. FIG. 40 illustrates an application 5000 of the novel invention with an operator of stationary equipment. Similar to the drivers previously described, a camera 5300 and computer 5500 can be located onboard large heavy primarily stationary equipment such as a crane and the camera 5300 aimed at the operator 5100 to be used to monitor attention vigilance as described in the previous embodiments.

Figure 41:
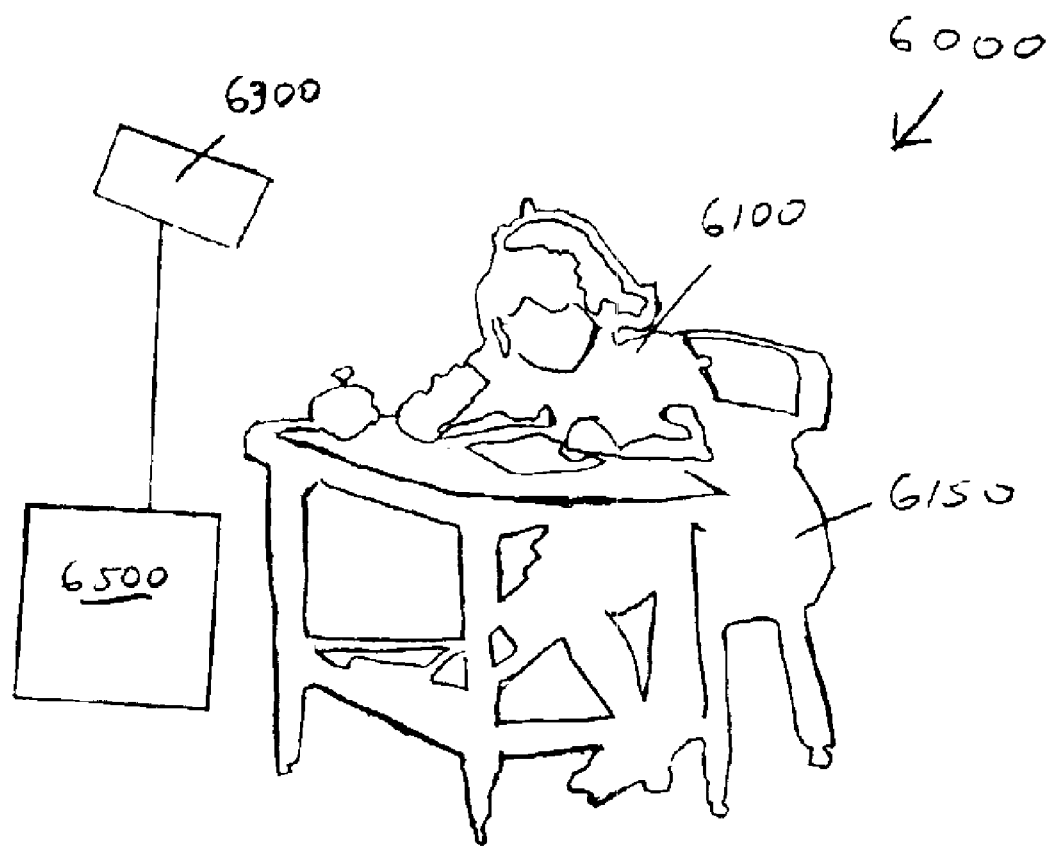
FIG. 41 illustrates an application of the novel invention for monitoring students/employees at work stations and/or during training/educational activities.

FIG. 41 illustrates an application 6000 of the novel invention for monitoring students/employees 6100 at work stations 6150 and/or during training/educational activities. A camera 6300 and computer 6500 similar to those previously described can be used to monitor the student/employee 6100. The invention can have applicability to long distance learning systems and multimedia courses with or without internet(world wide web) access. In particular, the invention can be used to monitor students that are sitting in classes, taking exams, performing activities, to make sure that the students are not falling asleep, and/or are paying attention, and/or are actually there to take the class(es). The vigilance detecting invention can also monitor these people for any drug and alcohol effects as previously described. The system can be automated to be used with one student or an entire class of students. The students can include those attending educational establishments and/or are employees in continuing education and/or training environments. Monitoring can be done over the worldwide web for one or more persons.

The alarm outputs from these applications can warn the students/employees directly and/or warn instructors, administrators at different locations when students/employees are failing to be vigilant during the class, training instruction or other monitored activity. The system can also monitor other types of employees in the workforce to make sure the employees are vigilant and not falling asleep, and/or when and if they are effected by lack of sleep and drug and alcohol effects.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A driver alertness system comprising:
   (a) a single camera within a vehicle aimed at a head region of a driver;
   (b) means for simultaneously monitoring head rotation, yawning and full eye occlusion of the driver with said camera, the head rotation including nodding up and down, and moving left to right, and the full eye occlusion including eye blinking and complete eye closure, the monitoring means includes means for determining left to right rotation and the up and down nodding from examining approximately 10 frames from approximately 20 frames; and
   (c) alarm means for activating an alarm in real time when a threshold condition in the monitoring means has been reached, whereby the driver is alerted into driver vigilance.

2. The system of claim 1 whereby the monitoring means includes:
   means for determining gaze direction of the driver.

3. The system of claim 1, wherein the monitoring means includes:
   a detected condition selected from at least one of: lack of sleep of the driver, driver fatigue, alcohol effects and drug effects of the driver.

4. The system of claim 1, wherein the monitoring means includes:
   inializing means to find a face of the driver;
   grabbing means to grab a frame;
   tracking means to truck head of the driver;
   measuring means to measure rotation and nodding of the driver;

detecting means to detect eye blinking and eye closures of the driver;

yawing means to detect yawning of the driver.

5. A method of detecting driver vigilance, comprising the steps of:

aiming a single camera at a head of a driver of a vehicle;

detecting frequency of up and down nodding and left to right rotations of the head within a selected time period of the driver with the camera;

determining frequency of eye blinkings and eye closings of the driver within the selected time period with the camera;

determining the left to right head rotations and the up and down head nodding from examining approximately 10 frames from approximately 20 frames;

detecting frequency of yawning of the driver within the selected time period with the camera; and generating an alarm signal in real time if a frequency value of the number of the frequency of the up and down nodding, the left to right rotations, the eye blinkings, the eye closings, the yawning exceed a selected threshold value.

6. The method of claim 5, further comprising the step of:

determining day and nighttime conditions, and generating the alarm signals in real time during both the day and the nighttime conditions.

7. The method of claim 5, wherein the selected time period includes:

at least approximately 20 frames.

8. The method of claim 5, wherein the selected time period includes:

within approximately 2 seconds.

9. The method of claim 5, wherein the generating step further includes the step of:

generating an onboard alarm to the driver in realtime.

10. The method of claim 5, wherein the generating step further includes the step of:

slowly slowing down the vehicle to a full stop.

11. The method of claim 5, wherein the generating step further includes the step of:

remotely transmitting the alarm signal to a third party located at a different location than the driver.

12. The method of claim 5, further comprising the step of:

providing the vehicle be selected from one of: a cab, a bus and a truck; and providing a dispatched at the different location.

13. The method of claim 5, further comprising the step of:

providing the vehicle be a plane; and providing a control tower as the different location.

14. The method of claim 5, further comprising the step of:

providing the vehicle be a watercraft; and providing a harbor master at the different location.

15. The method of claim 5, further comprising the step of:

providing the vehicle be a train; and providing a station master at the different location.

16. The method of claim 5, further comprising the step of:

detecting at least one of driver fatigue, driver lack of sleep, driver alcohol intoxication, and driver drug intoxication.

17. The method of claim 5, further comprising the steps of:

inializing to find a face of the driver;

grabbing a frame;

tracking the head of the driver;

measuring the rotation and the nodding of the driver;

detecting the eye blinking and the eye closures of the driver;

detecting the yawning of the driver.

18. A vigilance monitoring system, comprising:

means for detecting up and down head nodding, and left to right head rotation of a person to be monitored, the detecting means including a means for determining the left to right head rotation and the up and down nodding from examining approximately 10 frames from approximately 20 frames;

means for detecting eye blinkings and complete eye closures of the person;

means for detecting yawning of the person; and means for simultaneously monitoring the up and down head nodding and the head rotation detecting means, the eye blinking and the closure detecting means and the yawning detecting means within one computer.

19. The vigilance monitoring system of claim 18, further comprising:

a single camera for receiving visual images for the head rotation detecting means, the eye closure detecting means and the yawning detecting means.

20. The vigilance monitoring system of claim 18, wherein the person is a driver in a vehicle.

21. The vigilance monitoring system of claim 18 wherein the person is a pilot in a plane.

22. The vigilance monitoring system of claim 18, wherein the person is a skipper in a watercraft.

23. The vigilance monitoring system of claim 18, wherein the person is a driver of a truck.

24. The vigilance monitoring system of claim 18, wherein the person is an operator of heavy stationary equipment.

25. The vigilance monitoring system of claim 18, wherein the person is a student attending a class.

26. The vigilance monitoring system of claim 18, wherein the person is an employee at a workstation.

27. The vigilance monitoring system of claim 18, wherein the person is an employee being trained.

28. The vigilance monitoring system of claim 18, further comprising:

means for outputting an alarm signal when a selected threshold is reached from at least one of: the head nodding and the rotation detecting means, the yawning detecting means and the eye blinking and the eye closure detection means.

29. The vigilance monitoring system of claim 18, further comprising:

means for monitoring the person during both night time conditions.

30. The system of claim 18, wherein the monitoring means includes:

inializing means to find face of the driver;

grabbing means to grab a frame;

tracking means to track head of the driver;

measuring means to measure rotation and nodding of the driver;

detecting means to detect eye blinking and eye closures of the driver;

yawing means to detect yawning of the driver.

31. A method of monitoring attention vigilance, comprising the steps of:

detecting head nodding and head rotation of a person to be monitored;

determining left to right rotation and up and down nodding from examining approximately 10 frames from approximately 20 frames;

detecting eye blinking and eye closures of the person;

detecting yawning of the person; and simultaneously monitoring the head nodding and the head rotation, the eye blinking and eye closures and the yawning within one computer.

32. The method of claim 31, further comprising the step of:

detecting the nodding and the head rotation, the eye blinking and the closures and the yawning with a single camera.

33. The method of claim 31, further comprising the step of:

monitoring the person with identical equipment during day and night time conditions.

34. The method of claim 31, further comprising the step of:

detecting attention vigilance of a driver of a vehicle.

35. The method of claim 31, further comprising the step of:

detecting attention vigilance of an operator of stationary equipment.

36. The method of claim 31, further comprising the step of:

detecting attention vigilance of a pilot of a plane.

37. The method of claim 31, further comprising the step of:

detecting attention vigilance of an operator of a watercraft.

38. The method of claim 31, further comprising the step of:

detecting attention vigilance of a student being educated.

39. The method of claim 31, further comprising the step of:

detecting attention vigilance of an employee at work.

40. The method of claim 31, further comprising the steps of:

inializing to find face of the driver;

grabbing a frame;

tracking the head of the driver;

measuring the rotation and the nodding of the driver;

detecting the eye blinking and the eye closures of the driver;

detecting the yawning of the driver.

* * * * *